US009648581B1

(12) United States Patent
Vaynblat et al.

(10) Patent No.: US 9,648,581 B1
(45) Date of Patent: *May 9, 2017

(54) ROBUST GEOLOCATION SYSTEM IMPLEMENTATION FOR SERVING TARGETED ADVERTISEMENT AND PERSONALIZED CONTENT

(71) Applicant: RadiumOne, Inc., San Francisco, CA (US)

(72) Inventors: Dimitri Vaynblat, San Carlos, CA (US); Maxime Domain, San Francisco, CA (US)

(73) Assignee: RadiumOne, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,735

(22) Filed: Nov. 9, 2016

Related U.S. Application Data

(60) Provisional application No. 62/252,950, filed on Nov. 9, 2015.

(51) Int. Cl.
*G06F 15/173* (2006.01)
*H04W 64/00* (2009.01)
(Continued)

(52) U.S. Cl.
CPC ......... *H04W 64/006* (2013.01); *H04L 67/306* (2013.01); *H04L 67/42* (2013.01); *H04W 4/008* (2013.01); *H04W 84/12* (2013.01)

(58) Field of Classification Search
CPC ... H04L 67/42; H04L 67/26; H04N 21/23424; H04N 21/812; H04N 21/25841;
(Continued)

(56) References Cited

U.S. PATENT DOCUMENTS 7,761,549 B2  7/2010  Farnham et al.
7,848,765 B2  12/2010  Phillips et al.
(Continued)

FOREIGN PATENT DOCUMENTS

EP        2690404        1/2014
WO    WO/2009/073674    6/2009
(Continued)

OTHER PUBLICATIONS

Arvind Narayanan and Vitaly Shmatikov, Privacy and Security, Myths and Fallacies of "Personally Identifiable Information" Communications of the ACM | Jun. 2010 | vol. 53/ No. 6 pp. 24-26.
(Continued)

*Primary Examiner* — Hitesh Patel
(74) *Attorney, Agent, or Firm* — Aka Chan LLP

(57) ABSTRACT

A system receives geographic information from devices to determine and deliver relevant advertisements or personalized content for consumers. This ties a user's real-world location, with virtual leads (e.g., advertisements). The system uses geographical information gathered by mobile devices and saves the geographical information to consumer profiles. For example, the system can use different wireless radios present on mobile devices to gather different types of geographical information. Some radios include cellular, Bluetooth, global positioning system (or GPS), Wi-Fi, near field communications (or NFC), and other radios.

20 Claims, 14 Drawing Sheets

(51) Int. Cl.
  *H04L 29/06* (2006.01)
  *H04W 4/00* (2009.01)
  *H04L 29/08* (2006.01)
  *H04W 84/12* (2009.01)

(58) Field of Classification Search
  CPC .. H04N 21/4524; H04W 4/021; H04W 4/028; H04W 4/206; G06Q 30/0205
  See application file for complete search history.

(56) References Cited

U.S. PATENT DOCUMENTS

| | | | |
|---|---|---|---|
| 7,973,707 | B2 | 7/2011 | Verechtchiagine |
| 8,228,821 | B2 | 7/2012 | Robinson et al. |
| 8,265,606 | B2 | 9/2012 | Ghotge et al. |
| 8,266,697 | B2 | 9/2012 | Coffman |
| 8,311,950 | B1 | 11/2012 | Kunal et al. |
| 8,400,944 | B2 | 3/2013 | Robinson et al. |
| 8,463,295 | B1* | 6/2013 | Caralis .............. G06Q 30/0631 455/414.2 |
| 8,473,500 | B2 | 6/2013 | Baluja et al. |
| 8,531,293 | B2 | 9/2013 | Putz |
| 8,572,129 | B1 | 10/2013 | Lee |
| 8,577,590 | B2 | 11/2013 | Doyle |
| 8,589,491 | B2 | 11/2013 | Morin et al. |
| 8,593,276 | B2 | 11/2013 | Doyle |
| 8,626,187 | B2 | 1/2014 | Grosman et al. |
| 8,670,933 | B2 | 3/2014 | Schenken et al. |
| 8,719,183 | B2 | 5/2014 | Olsen, III et al. |
| 8,751,621 | B2 | 6/2014 | Vaynblat et al. |
| 8,832,188 | B1 | 9/2014 | Cierniak |
| 8,892,734 | B2 | 11/2014 | Vaynblat et al. |
| 8,971,930 | B2 | 3/2015 | Li et al. |
| 9,002,898 | B2 | 4/2015 | Narayanan et al. |
| 9,110,997 | B2 | 8/2015 | Vaynblat et al. |
| 9,117,240 | B2 | 8/2015 | Vaynblat et al. |
| 9,135,653 | B2 | 9/2015 | Vaynblat et al. |
| 9,384,665 | B2 | 7/2016 | Morgan et al. |
| 9,430,531 | B2 | 8/2016 | Vaynblat et al. |
| 2006/0122974 | A1 | 6/2006 | Perisic |
| 2006/0224729 | A1 | 10/2006 | Rowe et al. |
| 2007/0112730 | A1 | 5/2007 | Gulli et al. |
| 2007/0176771 | A1 | 8/2007 | Doyle |
| 2008/0086524 | A1 | 4/2008 | Afergan et al. |
| 2008/0091820 | A1 | 4/2008 | Norman et al. |
| 2008/0148373 | A1 | 6/2008 | Adams et al. |
| 2008/0222613 | A1 | 9/2008 | Allen et al. |
| 2008/0255944 | A1 | 10/2008 | Shah et al. |
| 2009/0089035 | A1 | 4/2009 | Solomon |
| 2009/0140886 | A1 | 6/2009 | Bender |
| 2009/0182589 | A1* | 7/2009 | Kendall .............. G06Q 10/02 705/5 |
| 2009/0198562 | A1 | 8/2009 | Wiesinger et al. |
| 2009/0228296 | A1 | 9/2009 | Ismalon |
| 2009/0254572 | A1 | 10/2009 | Redlich et al. |
| 2009/0309789 | A1 | 12/2009 | Verechtchiagine |
| 2009/0327296 | A1 | 12/2009 | Francis et al. |
| 2010/0042940 | A1 | 2/2010 | Monday et al. |
| 2010/0042944 | A1 | 2/2010 | Robinson et al. |
| 2010/0077048 | A1 | 3/2010 | Czyzewicz et al. |
| 2010/0082695 | A1 | 4/2010 | Hardt |
| 2010/0205541 | A1 | 8/2010 | Rapaport et al. |
| 2010/0253508 | A1 | 10/2010 | Koen et al. |
| 2010/0257023 | A1 | 10/2010 | Kendall et al. |
| 2010/0293052 | A1 | 11/2010 | Diorio et al. |
| 2010/0318925 | A1 | 12/2010 | Sethi et al. |
| 2010/0332652 | A1 | 12/2010 | Bhattacharya et al. |
| 2011/0004692 | A1 | 1/2011 | Occhino et al. |
| 2011/0035503 | A1 | 2/2011 | Zaid |
| 2011/0093506 | A1 | 4/2011 | Lunt et al. |
| 2011/0112768 | A1 | 5/2011 | Doyle |
| 2011/0148634 | A1 | 6/2011 | Putz |
| 2011/0184792 | A1 | 7/2011 | Butcher |
| 2011/0205939 | A1 | 8/2011 | Yu et al. |
| 2011/0208822 | A1 | 8/2011 | Rathod |
| 2011/0238300 | A1 | 9/2011 | Schenken |
| 2011/0258042 | A1 | 10/2011 | Purvy et al. |
| 2011/0258064 | A1 | 10/2011 | Agarwal et al. |
| 2011/0264519 | A1 | 10/2011 | Chan et al. |
| 2011/0265011 | A1 | 10/2011 | Taylor et al. |
| 2011/0276396 | A1 | 11/2011 | Rathod |
| 2012/0011202 | A1 | 1/2012 | Occhino et al. |
| 2012/0047577 | A1 | 2/2012 | Costinsky |
| 2012/0109732 | A1 | 5/2012 | Jaffe |
| 2012/0191764 | A1 | 7/2012 | Leibu et al. |
| 2012/0225720 | A1 | 9/2012 | Baszucki |
| 2012/0259537 | A1 | 10/2012 | Schmidt et al. |
| 2012/0266081 | A1 | 10/2012 | Kao |
| 2012/0271719 | A1 | 10/2012 | Straley et al. |
| 2012/0290565 | A1 | 11/2012 | Wana et al. |
| 2012/0290672 | A1 | 11/2012 | Robinson et al. |
| 2012/0307645 | A1 | 12/2012 | Grosman et al. |
| 2012/0309409 | A1 | 12/2012 | Grosman et al. |
| 2012/0309413 | A1 | 12/2012 | Grosman et al. |
| 2012/0324027 | A1 | 12/2012 | Vaynblat |
| 2013/0031029 | A1 | 1/2013 | Davidson |
| 2013/0099977 | A1 | 4/2013 | Sheshadri et al. |
| 2013/0154817 | A1 | 6/2013 | Olsen, III et al. |
| 2013/0203445 | A1 | 8/2013 | Grainger et al. |
| 2013/0231137 | A1* | 9/2013 | Hugie .............. H04W 24/00 455/456.3 |
| 2013/0290427 | A1 | 10/2013 | Proud |
| 2013/0295955 | A1 | 11/2013 | Sheshadri et al. |
| 2013/0295970 | A1 | 11/2013 | Sheshadri et al. |
| 2013/0310053 | A1 | 11/2013 | Srivastava et al. |
| 2013/0331128 | A1 | 12/2013 | Qiu |
| 2014/0057648 | A1 | 2/2014 | Lyman et al. |
| 2014/0066090 | A1 | 3/2014 | Henderson |
| 2014/0121957 | A1 | 5/2014 | Schenken et al. |
| 2014/0121958 | A1 | 5/2014 | Schenken et al. |
| 2014/0129349 | A1 | 5/2014 | Vaynblat et al. |
| 2014/0129660 | A1 | 5/2014 | Vaynblat et al. |
| 2014/0257981 | A1 | 9/2014 | Baek |
| 2014/0257982 | A1 | 9/2014 | Vaynblat et al. |

FOREIGN PATENT DOCUMENTS

| | | |
|---|---|---|
| WO | WO/2009/152262 | 12/2009 |
| WO | WO/2011/057273 | 5/2011 |
| WO | WO/2011/119538 | 9/2011 |
| WO | WO/2012/122448 | 9/2012 |
| WO | WO/2012/166356 | 12/2012 |
| WO | WO/2013/015864 | 1/2013 |
| WO | WO/2013/058954 | 4/2013 |
| WO | WO2013131077 | 9/2013 |
| WO | WO/2013/166033 | 11/2013 |
| WO | WO/2013/166042 | 11/2013 |
| WO | WO/2013/173147 | 11/2013 |
| WO | WO/2014/016096 | 1/2014 |
| WO | WO/2014/031906 | 2/2014 |
| WO | WO/2014/039672 | 3/2014 |
| WO | WO/2014/072510 | 5/2014 |

OTHER PUBLICATIONS

Wortham, Jenna, "Goo.gl Challenges Bit.ly as King of the Short," NYTimes.com, Dec. 14, 2009, 2 pages, retrievable from http://bits.blogs.nytimes.com/2009/12/14/googl-challenges-bitly-as-king-of-the-short/?_r=0.

* cited by examiner

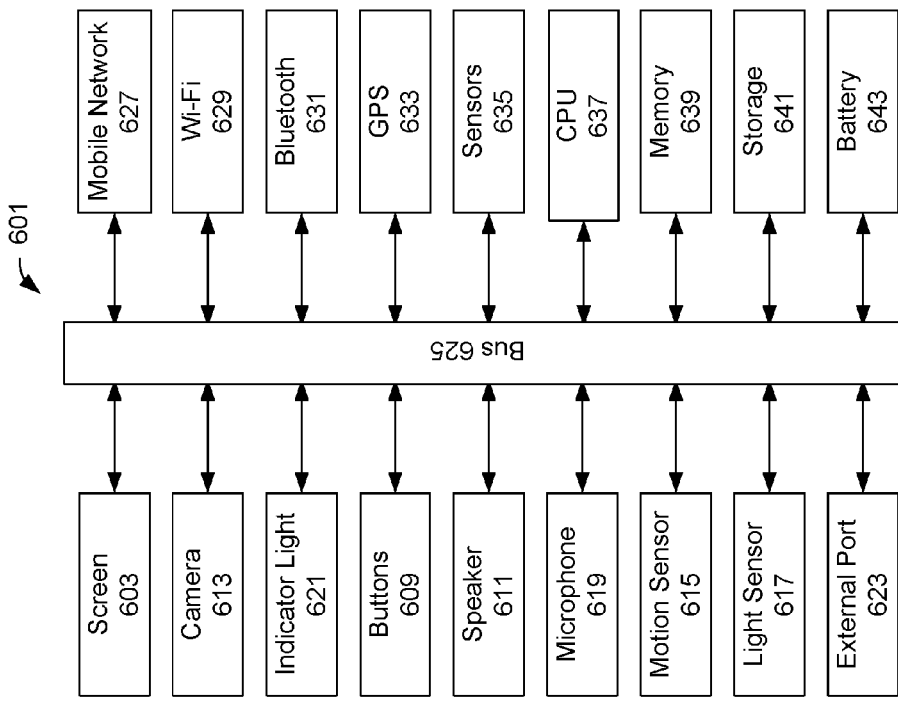
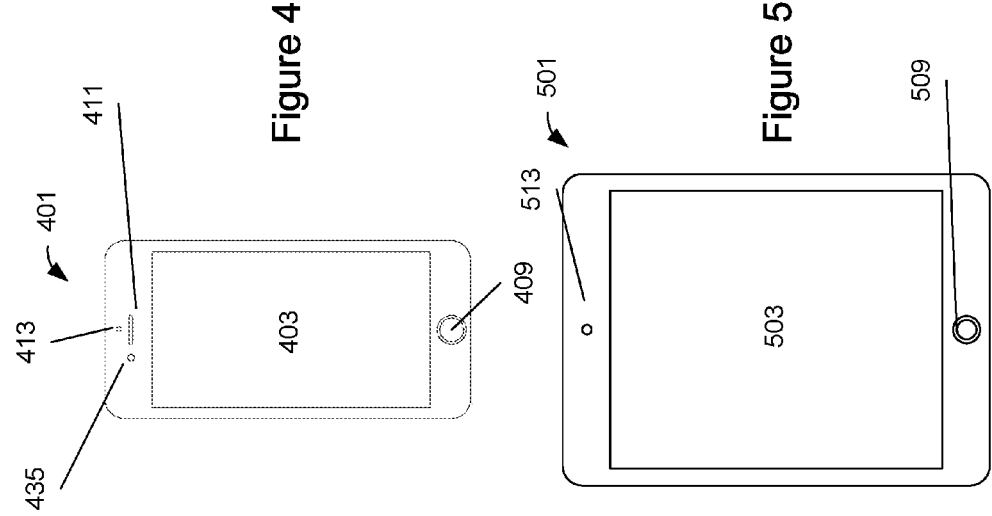

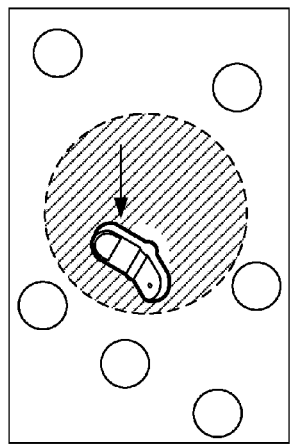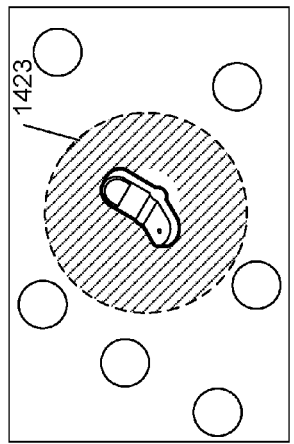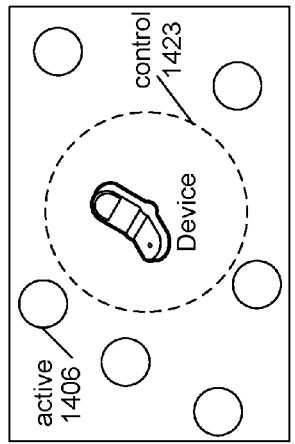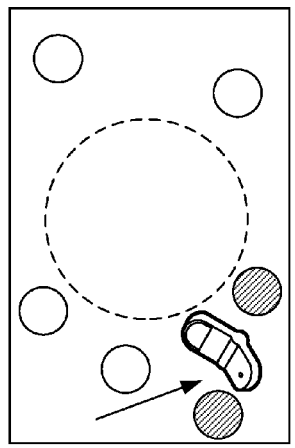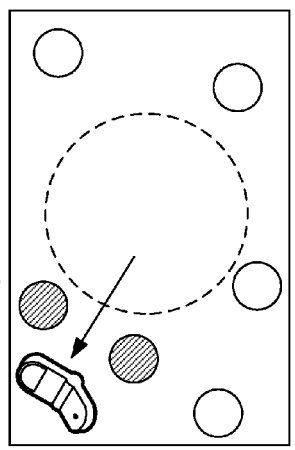

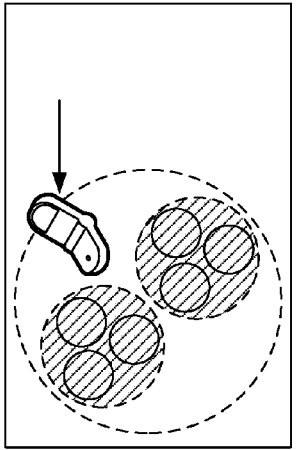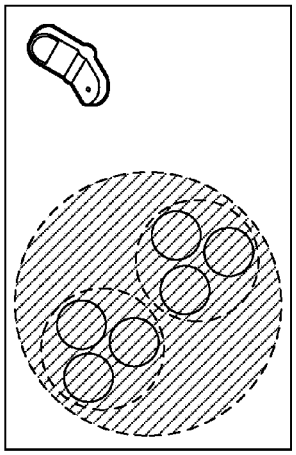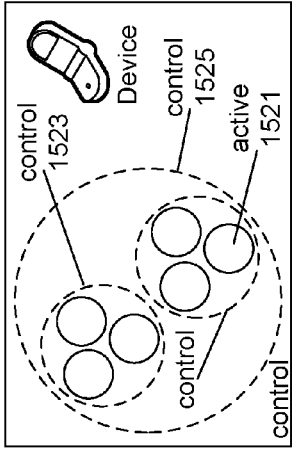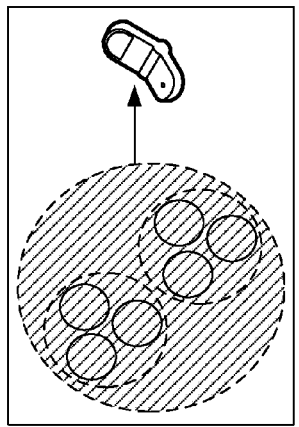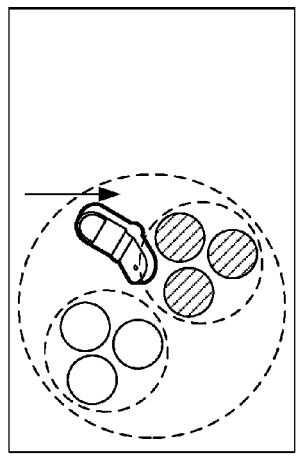

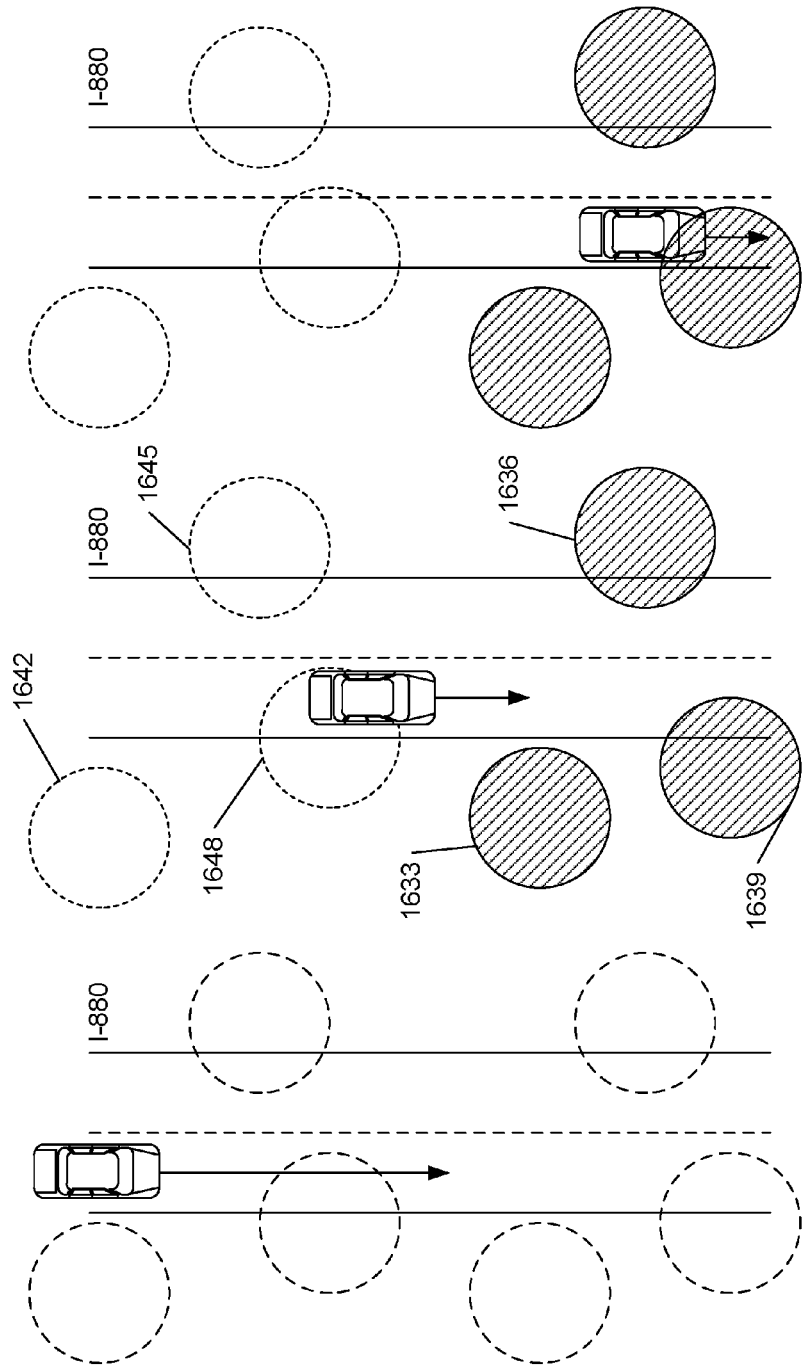

ROBUST GEOLOCATION SYSTEM IMPLEMENTATION FOR SERVING TARGETED ADVERTISEMENT AND PERSONALIZED CONTENT

CROSS-REFERENCE TO RELATED APPLICATIONS

This patent application claims the benefit of U.S. patent application 62/252,950, filed Nov. 9, 2015, which is incorporated by reference along with all other references cited in this application.

BACKGROUND OF THE INVENTION

This invention relates to online (web, mobile, and IPTV) networks and content providers, and more specifically to allowing advertisers to more accurately target their intended audience.

The Internet is a global system of interconnected computer networks of which can include computers or related electronic devices such as smartphones, phablets, tablets, and many others, not only desktop and laptop computers. People are spending more of their time on the Internet. Via computers and smartphones, people are surfing the Web, sending e-mail, watching videos, reading news, making appointments, shopping, and much more. The Internet has taken market share from many other communications media including the telephone, television, radio, magazines, and newspapers. Consequently, content providers and advertisers want more information about the activities and habits of online users in order to better target content, including advertisements.

Among the different types of information that can be used by advertisers, location information can be particularly valuable. Knowing what location a consumer (also sometimes referred to as an online user) is or was in allows advertisers to more accurately target the consumer's likely desires or needs and determine the availability of products and services nearby.

Previously, this information was difficult to access, or had only limited accuracy. Also, it was difficult to control collection of this information around valuable locations. For example, devices connected to the internet are associated with an Internet Protocol address (or IP address). Geographical location could be derived by using IP addresses, but it has limited accuracy, such as the device's current city. As another example, geographical location could be obtained through GPS triangulation, which is more accurate, but it would require the user to be actively using a mobile device, limiting the number of valuable locations collected for that user. However, with more accurate geographical information and better control of collection of geographical information, advertisers can transmit advertisements that are even more relevant to consumers and increase the likelihood that consumers will find an advertisement useful and eventually purchase advertised products or services.

Therefore, there is a need for a technique to gather more accurate location information, in particular at valuable locations, such as using geofencing and making better use of the information to improve ad targeting and content personalization according to user connection models based on sharing activity among users for online (web, mobile, and IPTV) media.

BRIEF SUMMARY OF THE INVENTION

A system receives geographic information from devices to determine and deliver relevant advertisements or personalized content for consumers. This ties a user's real-world location, with virtual leads (e.g., advertisements). The system uses geographical information gathered by mobile devices and saves the geographical information to consumer profiles. For example, the system can use different wireless radios present on mobile devices to gather different types of geographical information. Some radios include cellular, Bluetooth® (trademark of Bluetooth Sig Inc.), global positioning system (or GPS), Wi-Fi, near field communications (or NFC), and other radios. Different sources of location information can result in different levels of geographical specificity. The system is flexible in using one or any combination of these sources of location information for greater and less geographical specificity. For example, if an advertiser wants to know if a user has been to a coffee store or electronics store, cellular location information may not be able to provide enough accuracy, making GPS a better solution. In another example, if an advertiser wants to know where in a mall a user is shopping, GPS may not be a possible solution. GPS tends to be battery intensive and provides limited information in areas where there is no clear view of the sky. In this case, Bluetooth or Wi-Fi becomes a better solution.

In an implementation, the system ties a user's real-world (or physical) location with the user's interests, and then with online advertisement campaigns delivered to this user. For example, just as web beacons (or web pixels) scattered on different sections of a web site can be used to generate analytics and segments based on user behavior in on the web, geolocation beacons scattered in different sections of a physical location can be used to generate analytics and segments based on user behavior in the physical world. From these geolocation beacons, the system determines user interest and intent. As another example, geographic geofences set up on all brick and mortar locations of a retail chain can be used to generate segment of users by frequency of visit which in turn can by used for more efficient advertising.

In an implementation, a method includes: receiving first activity information for a sender of a first link to at least one recipient is collected by a collection resource at a Web site, wherein no personally identifiable information of the sender is collected in collecting the first activity information; storing the first activity information at a storage server; receiving second activity information when a recipient accesses the first link sent by the sender corresponding to the first activity information stored at the storage server, wherein no personally identifiable information of the recipient is collected in collecting the second activity information; using at least one processor, attempting to identify a first node representative of the sender in a social graph, wherein nodes in the social graph do not store personally identifiable information; and when a first node representative of the sender in a social graph is not identified and after receiving the second activity information, creating a second node to represent the sender in the social graph.

The method further includes: receiving a geofencing alert from a mobile device of a mobile user (or first user), where a geofencing software development kit is integrated in an application on the mobile device, and the geofencing alert is a result of the mobile device entering a geofence location; using at least one processor, based on the geofencing alert, attempting to identify a third node representative of the mobile user in a social graph, where no personally identifiable information of the mobile user is collected in the geofencing alert; and when a third node representative of the mobile user in a social graph is not identified, creating a fourth node to represent the mobile user in the social graph.

The attempting to identify a third node representative of the mobile user in a social graph can include: when a cookie is included with the geofencing alert, extracting a user identifier from the cookie and attempting to identify a node in the social graph having the same user identifier; and when a cookie is not included with the geofencing alert, receiving device fingerprinting attributes from the mobile device and using probabilistic fingerprinting algorithms and the device fingerprinting attributes to identify a node match in the social graph.

The attempting to identify a third node representative of the mobile user in a social graph can include: when a cookie is not included with the geofencing alert, receiving device fingerprinting attributes from the mobile device, extracting a device identifier from the device fingerprinting attributes, and attempting to match the extracted device identifier to a device identifier associated with a node in the social graph. The device identifier can be a hashed device identifier.

The using probabilistic fingerprinting algorithms and the device fingerprinting attributes to identify a node match in the social graph can include: inferring a relationship exists between the mobile device and another device if the two devices are often reported to be at a location or vicinity of the location during the same or similar time period. The device fingerprinting attributes can include at least one of device identifiers; IP addresses; operating systems; browser types; browser versions; or user navigational, geo-temporal, and behavioral patterns.

The collection resource at a Web site used to collect first activity information can be a sharing widget. The collection resource at a Web site used to collect first activity information can include a uniform resource locator (URL) shortening. The collection resource at a Web site used to collect first activity information can include an instant messenger application.

The method can include serving a personalized content to the mobile user based on a connectivity of the fourth node within the social graph, where the personalized content is personalized to the fourth node, which is representative of the mobile user. The method can include serving a personalized content to the mobile user based on the geofence location that triggered the geofencing alert, where the personalized content is personalized to the mobile user for the geofence location. The serving a personalized content to the mobile user can be via a push notification message to the mobile device.

The geofencing alert from a mobile device of a mobile user can be triggered while the mobile device is inactive. The geofencing alert from a mobile device of a mobile user can be triggered while the application with the geofencing software development kit is closed.

The method can include: receiving a bid request from a real-time bidding exchange; determining the bid request is associated with the fourth node in the social graph; and based on at least information associated with the fourth node in the social graph, determining a personalized digital content for a bid in response to the bid request. The method can include using the social graph, selecting a personalized digital content for delivery to the recipient, where the personalized digital content is personalized to the fourth node, which is representative of the mobile user.

In an implementation, a method includes: receiving first activity information for a sender of a first link to at least one recipient is collected by a collection resource at a Web site, where no personally identifiable information of the sender is collected in collecting the first activity information; storing the first activity information at a storage server; receiving second activity information when a recipient accesses the first link sent by the sender corresponding to the first activity information stored at the storage server, where no personally identifiable information of the recipient is collected in collecting the second activity information; using at least one processor, attempting to identify a first node representative of the sender in a social graph, where nodes in the social graph do not store personally identifiable information; and when a first node representative of the sender in a social graph is not identified and after receiving the second activity information, creating a second node to represent the sender in the social graph.

The method can further include: receiving a geolocation information from a mobile device of a mobile user, where a nongeofencing software development kit is integrated in an application on the mobile device, and the geolocation information is a result of the mobile device using the application at a geolocation; using at least one processor, based on the geolocation information, attempting to identify a third node representative of the mobile user in a social graph, where no personally identifiable information of the mobile user is collected in the geolocation information; and when a third node representative of the mobile user in a social graph is not identified, creating a fourth node to represent the mobile user in the social graph.

The method can include enriching the fourth node of the social graph with the geolocation information, where the fourth node does not store personally identifiable information. The method can include upon the mobile device entering a geofence location and the mobile device in inactive and the application is closed, not receiving a geofencing alert from a mobile device of a mobile user. The attempting to identify a third node representative of the mobile user in a social graph can include: when a cookie is included with the geofencing alert, extracting a user identifier from the cookie and attempting to identify a node in the social graph having the same user identifier; and when a cookie is not included with the geofencing alert, receiving device fingerprinting attributes from the mobile device and using probabilistic fingerprinting algorithms and the device fingerprinting attributes to identify a node match in the social graph.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-5 show examples of mobile devices, which can be mobile clients.

FIG. 6 shows a system block diagram of a mobile device used to execute software of the present invention.

FIGS. 14A-14E show sample scenarios of using large control geofences to adjust a heartbeat frequency.

FIGS. 15A-15E show sample scenarios of using a sequence of control geofences with progressively reduced coverage area to work around the limitation on the maximum number of geofences a device can register at the same time.

FIGS. 16A-16C show sample scenarios of geofence selection when a user is traveling at a high speed.

DETAILED DESCRIPTION OF THE INVENTION

Figure 1:
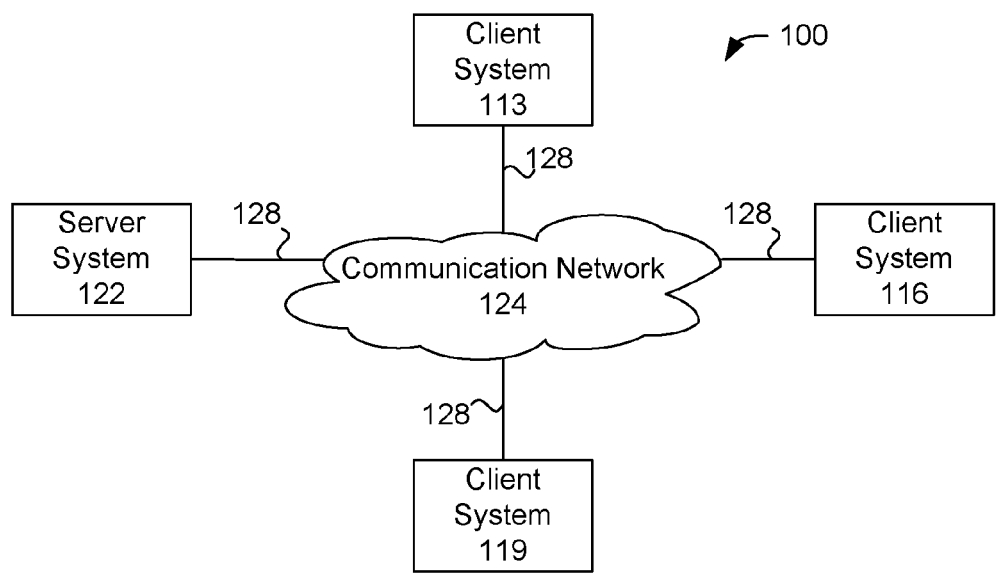
FIG. 1 shows a simplified block diagram of a client-server system and network in which an embodiment of the invention may be implemented.

FIG. 1 is a simplified block diagram of a distributed computer network 100 which embodiment of the present invention can be applied. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet. In other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skills in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, for performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
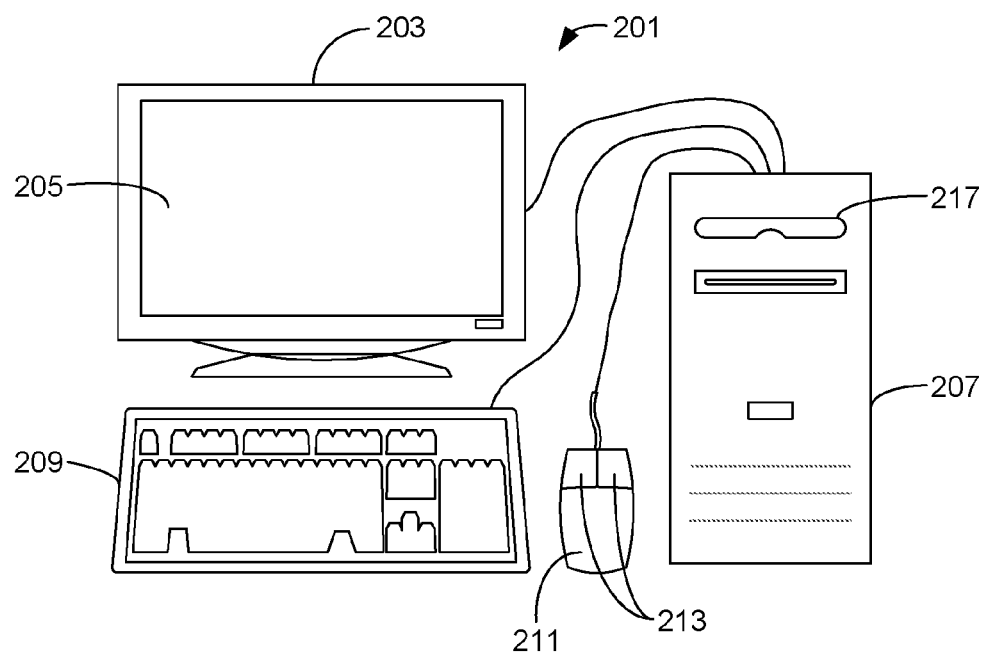
FIG. 2 shows a more detailed diagram of an exemplary client or server computer which may be used in an implementation of the invention.

FIG. 2 shows an exemplary computer system (e.g., client or server) of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with a computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
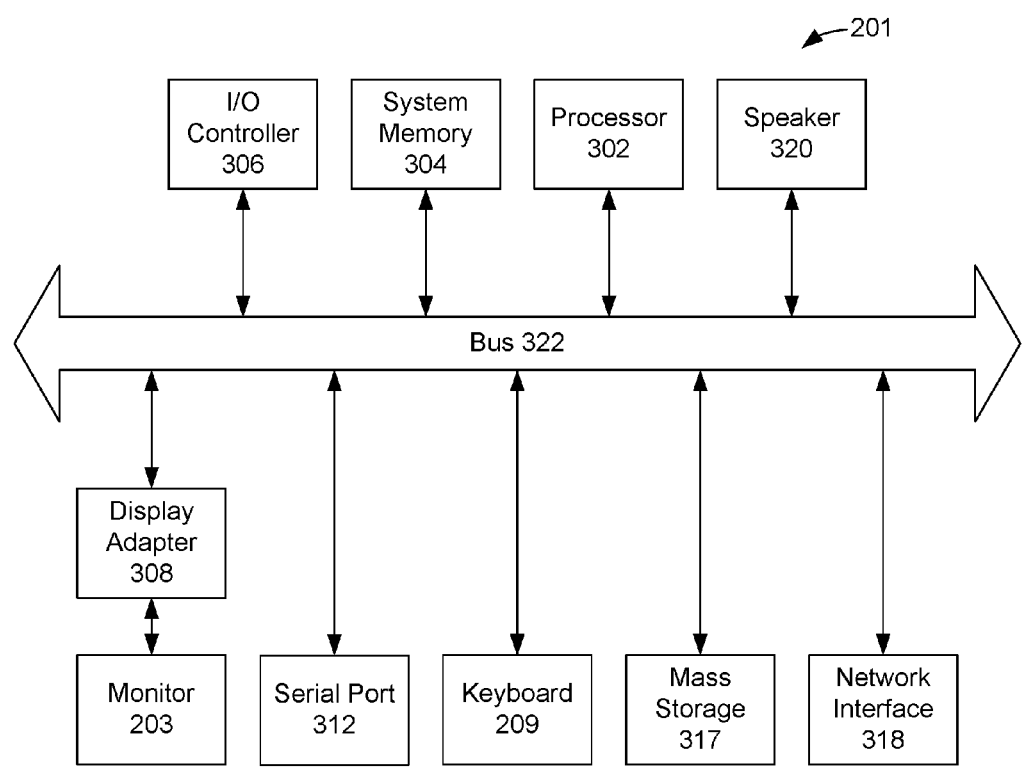
FIG. 3 shows a system block diagram of a client or server computer system used to execute application programs such as a web browser or tools.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as Ruby on Rails® (trademark of Hansson, David Heinemeier), PostgreSQL (or Postgres) with PostGis, C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). The computer software can include database operating using various database implementations, such as MySQL, REDIS, or other database software.

An operating system for the system may be one of the Microsoft Windows® (trademark of Microsoft) family of operating systems (e.g., Windows 95, 98, Me, Windows NT, Windows 2000, Windows XP, Windows XP x64 Edition, Windows Vista, Windows 7, Windows 8, Windows 10, Windows CE, Windows Mobile), Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

FIGS. 4-5 show examples of mobile devices, which can be mobile clients. Mobile devices are specific implementations of a computer, such as described above. FIG. 4 shows a smartphone device 401, and FIG. 5 shows a tablet device 501. Some examples of smartphones include the Apple iPhone, Samsung Galaxy, and Google Nexus family of devices. Some examples of tablet devices include the Apple iPad, Samsung Galaxy Tab, and Google Nexus family of devices.

Smartphone 401 has an enclosure that includes a screen 403, button 409, speaker 411, camera 413, and proximity sensor 435. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 409 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 501 is similar to a smartphone. Tablet 501 has an enclosure that includes a screen 503, button 509, and camera 513. Typically the screen (e.g., touch screen) of a tablet is larger than a smartphone, usually 7, 8, 9, 10, 12, 13, or more inches (measured diagonally).

FIG. 6 shows a system block diagram of mobile device 601 used to execute the software of the present invention. This block diagram is representative of the components of smartphone or tablet device. The mobile device system includes a screen 603 (e.g., touch screen), buttons 609, speaker 611, camera 613, motion sensor 615, light sensor 617, microphone 619, indicator light 621, and external port 623 (e.g., USB port or Apple Lightning port). These components can communicate with each other via a bus 625.

The system includes wireless components such as a mobile network connection 627 (e.g., mobile telephone or mobile data), Wi-Fi 629, Bluetooth 631, GPS 633 (e.g., detect GPS positioning), other sensors 635 such as a proximity sensor, CPU 637, RAM memory 639, storage 641 (e.g. nonvolatile memory), and battery 643 (lithium ion or lithium polymer cell). The battery supplies power to the electronic components and is rechargeable, which allows the system to be mobile.

In an implementation, the system includes a software development kit or SDK. This allows functionality of the system to be integrated into third-party applications (or partner applications). The SDK can include application programming interfaces, libraries, drivers, documentations, or tools (e.g., debugging tools, tracking tools, optimization tools) to allow the third-party access to the system's functionality. For example, the SDK can include one or more application programming interfaces (or APIs) that allow software programmers to integrate their software with features and code from the SDK. Other supporting material such as sample code and supporting technical notes can be included to help software programmers make use of the SDK. Third-party applications can choose to implement all or just a partial set of the functions provided by the system's SDK. As an example, a third-party can choose an implementation of a geolocation gathering feature of the system, an advertisement feature of the system, or a combination of both.

In an implementation, the system is included with an application installed on a user's device. The device can be a smartphone, phablet, or tablet. For example, the system includes a smartphone consisting of an application installed from an applications store (e.g., Google's Play™ (trademark of Google Inc.), Apple's App Store$^{SM}$ (service mark of Apple Inc.) Window's app store, Blackberry's App BlackBerry® World® (trademark of BlackBerry Limited).

Geofences

In an implementation, the system uses geofencing. A geofence is a virtual space corresponding to a real-world geographical (or physical) location. The real-world geographical location tracked by a single geofence can correspond to areas of different sizes. For example, a geofence can include a home, shopping center, school, workplace, city or other location of larger or smaller sizes. A geofence can be established by defining a center-point and a radius distance from the center-point, which determines the overall geographical area covered by the geofence. Usually, the center-point will be the location of interest for the geofence. In another implementation, a geofence can take other shapes, such as a rectangle, square, polygon, or other shape. When a device enters or exits a geofence, a notification is generated. This notification is transmitted to the system for further analysis.

The system can use two types of geofences, individually or in combination: (1) geographic (or physical) geofences and (2) beacon (or proximity) geofencing information. Geographical geofences refers to a location that can be identified as an area on a geographical map. Some sources of geographical geofences used by the system include GPS, cellular tower data, Wi-Fi access point, or any combination of these. Beacon geofencing information refers to a location that can be identified as an area near a physical device or beacon. Some sources of proximity geofences usable by the system include Bluetooth, NFC, Wi-Fi, or other radios. For this application, the term geofencing refers to one of or both of these types of geofences (e.g., proximity and geographic geofencing).

Geofencing can use one or more geographic information sources, in combination or separately. For example, when using GPS, the location of a device can be determined accurately up to several meters (e.g., five meters to fifteen meters). However, GPS oftentimes will not work indoors. When using a Wi-Fi access point, the location of a device can be determined accurately up to a router's maximum range (e.g., twenty meters to two hundred meters). When using cellular towers, the location of a device can be determined up to several thousand meters (e.g., five hundred meters to ten kilometers). This will depend on how many cellular antennas are in a given area. For areas with a greater density of antennas, the accuracy using this method is higher. When using Bluetooth, the location of a device can be determined to within less than a meter (e.g., using triangulation).

Since using these sources of geographical information can be battery intensive and vary in accuracy, the system is able to use different sources of geographical information in combination or separately depending on different situations. For example, while GPS is oftentimes the most accurate, it also results in a high battery drain. So, geofencing can use Wi-Fi or cellular tower information instead. Also, to conserve battery power, the system does not require real-time geographical information all the time. For example, the system works with limited geographical information, such information taken every given interval of time (e.g., one, two, five, ten, fifteen minutes or one, two, three, four hours, or any amount of time), or according to an operating system specified method, an application specified method, or other methods as discussed in this application.

In an implementation, the system uses geofencing abilities defined by a device's operating system. For example, the system does not directly implement methods to retrieve geofencing or location information from a device, but accesses the information through functions built into the device's operating system. The location information retrieved using this method is agnostic; this means that the operating system for the device reports to the system location information that can come from any of the geographical information sources as described elsewhere in this application. Different operating systems can impose different limitations on the number of geofences that can be monitored by operating systems. For example, for Apple's iOS operating system, applications are limited to monitoring twenty geofences per application installed on a device at a given time. On the other hand, for Google's Android$^{SM}$ (service mark of Google Inc.) operating system, applications can monitor one hundred geofences per application installed on a device at a given time. These limitations assist the different operating systems to control battery consumption and can change according to different technological trends (e.g., improved battery capacity, more efficient components, or other trends).

In an implementation, the system uses geofencing data from Bluetooth-enabled devices. Bluetooth beacons can include an identifier, and major and minor keys. These are used by the system to uniquely identify each Bluetooth beacon, so that each beacon can be associated with other information of the system (e.g., store location, store name, latitude and longitude, placement, associated products or advertisements, or other information). Bluetooth provides an accurate and energy efficient method of determining a user's proximity to a beacon and since the beacon's position is stored in the system, an accurate relative position of the user can be determined. This allows advertisers to access to geographical information not available to advertisers before.

For example, in a shopping center, Bluetooth beacons can be used to identify not only which store a user is visiting, but even more precise location information on where the user is in the store. For example, for a Bluetooth beacon near a home audio section and a Bluetooth beacon near a personal computer section at an electronics store, the system can determine the user is at the home audio section of the store and not the personal computer section. The system can also determine, using the amount of time the user spends within the home audio section determined from the entry and exit information for the beacon, what level of interest the user has (e.g., a user stopped to ask questions, user is just browsing the store, or other level of interest). If the system determines the user is likely interested in home audio, this information can be stored with the user's profile, and retrieved for later use.

In an implementation, the system includes a geofence database that maintains a listing of proximity geofences and geographic geofences. The database includes for each geofence a geofence identifier and a listing of various attributes that identify geofence location in the physical world. These attributes could include key elements defining geographical area covered by geofence, such as lat-long coordinates of a center point of the geofence, geofence radius, coordinates of the point of the geofence defining polygon, or various beacon attributes, such as beacon unique identifiers, and minor and major keys. The geofence database (or a separate database) could also include additional information related to geofences such as (a) geofence geolocation at various levels of granularity (e.g., zip code, city), (b) geofence type (active vs. control as describe in greater detail elsewhere in this application), and (c) geofence geocategory (e.g., Joe's coffee shop, Walgreens® pharmacy (Walgreens is a trademark of Walgreen Co.), Farmers Market in San Mateo). The geofence database can include numerous geofences that are usable within the system.

In an implementation, the system includes at least two types of geofences. A first type of geofence, called regular or active geofences, corresponds to geolocation that could be valuable for delivering targeted advertisement or personalized content, or both. Typically visits of such locations are strong indicators of user interests or intents associated with currently active, soon-to-be-started, or often-run advertisement campaigns, or with high-value categories that might help targeting future advertisement campaigns. For example, a geofence build around Joe's coffee shop could be valuable for targeting a coffee shop advertisement campaign. A second type of geofence, called special or control geofences, are used to efficiently manage active geofences as described in greater detail elsewhere in this application. Control geofences do not directly correspond to geolocations whose visits could be strong indicators of user interests or intents associated with advertisement campaigns.

As discussed above, some operating systems impose limitations on the number of geofences stored and monitored by a device at a given time (e.g., twenty geofences per application for Apple's iOS and a hundred geofences per application for Google's Android). On the other hand, the systems geofence database could contain hundreds of thousands geofences valuable for business purposes, such as delivering targeted advertisement or personalized content, or both. Because of this, proper selection of geofences that should be stored and monitored by a device at a specific point in time is very important. The goal is to maximize the chance that at the moment a user is crossing a valuable geofence this geofence is being stored and monitored by the user's device—resulting in capturing valuable geofence crossing signals. For example, a geofence monitored by a device would be one that a user will likely trigger since it is within a certain distance from the last location the user was detected.

In an implementation, the system periodically updates geofences monitored by a device. Geofence update process consists of several steps: (a) at the moment of update the system's geofence SDK installed on the device transmits the device location information to the system's backend, (b) the system's backend selects (among all geofences stored in the system geofence database) geofences the most relevant to a device and its current location, (c) the system's backend sends selected geofences to the system's geofence SDK installed on the device, and (d) the list of monitored geofences is updated on the device (e.g., replacing all monitored geofences, replacing a portion of monitored geofences, or other).

The system can use one or more methods to determine what geofences should be stored and monitored on a device, at a specific point in time. This collection of methods is called geofence distribution logic.

The geofence update process described above can be a processing power intensive process that can drastically reduce device battery life. If the frequency of geofence updates is too high, the device battery will be drained very fast. If, on the other hand, the frequency of geofence updates is too low, many valuable geolocation visits will not be captured by the system as in many occasions at the moment the user crosses a valuable geofence this geofence will not be stored and monitored by the user's device. As a result, the system will select an optimal update frequency in order to balance the desire for reduced power consumption with the desire for the most relevant geofences being monitored by the device.

The system can use one or more methods to determine optimal update frequency. This collection of methods is called active polling logic.

Various methods used by the system to manage geofences and refresh them periodically on a user's device, including geofence distribution logic and active polling logic, are described in greater detail elsewhere in this application.

Geofences can be used for delivering targeted advertisement or personalized content, or both, to users. As described in greater detail elsewhere in this application, geofence crossing signals can be used (a) directly for delivering geotargeted advertisement on the device while the device is still inside or in the vicinity of the geofence, or (b) for building user profiles and social graphs that could be used in the future for delivering targeted advertisement on the same or different devices of the user or (c) for other purposes.

Figures 7A, 7B, 7C:
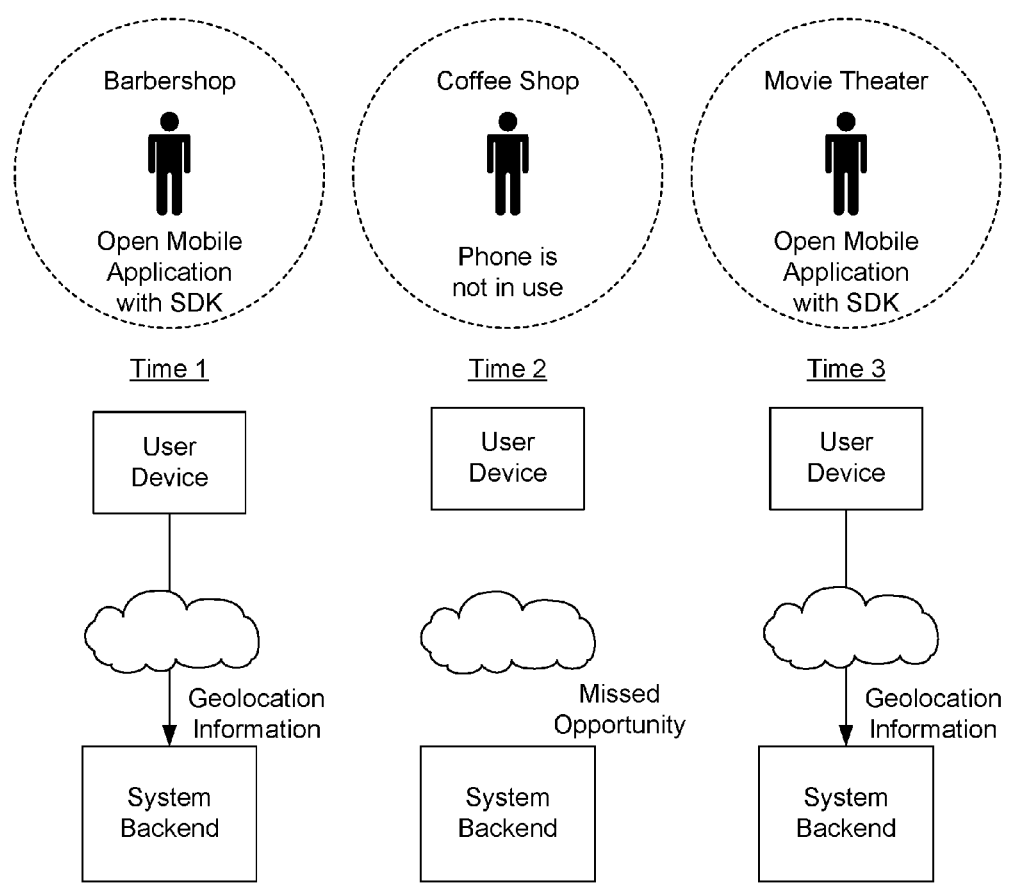
FIGS. 7A-7C show an example of capturing high-value geolocation targeting information without geofencing.
Figures 8A, 8B, 8C:
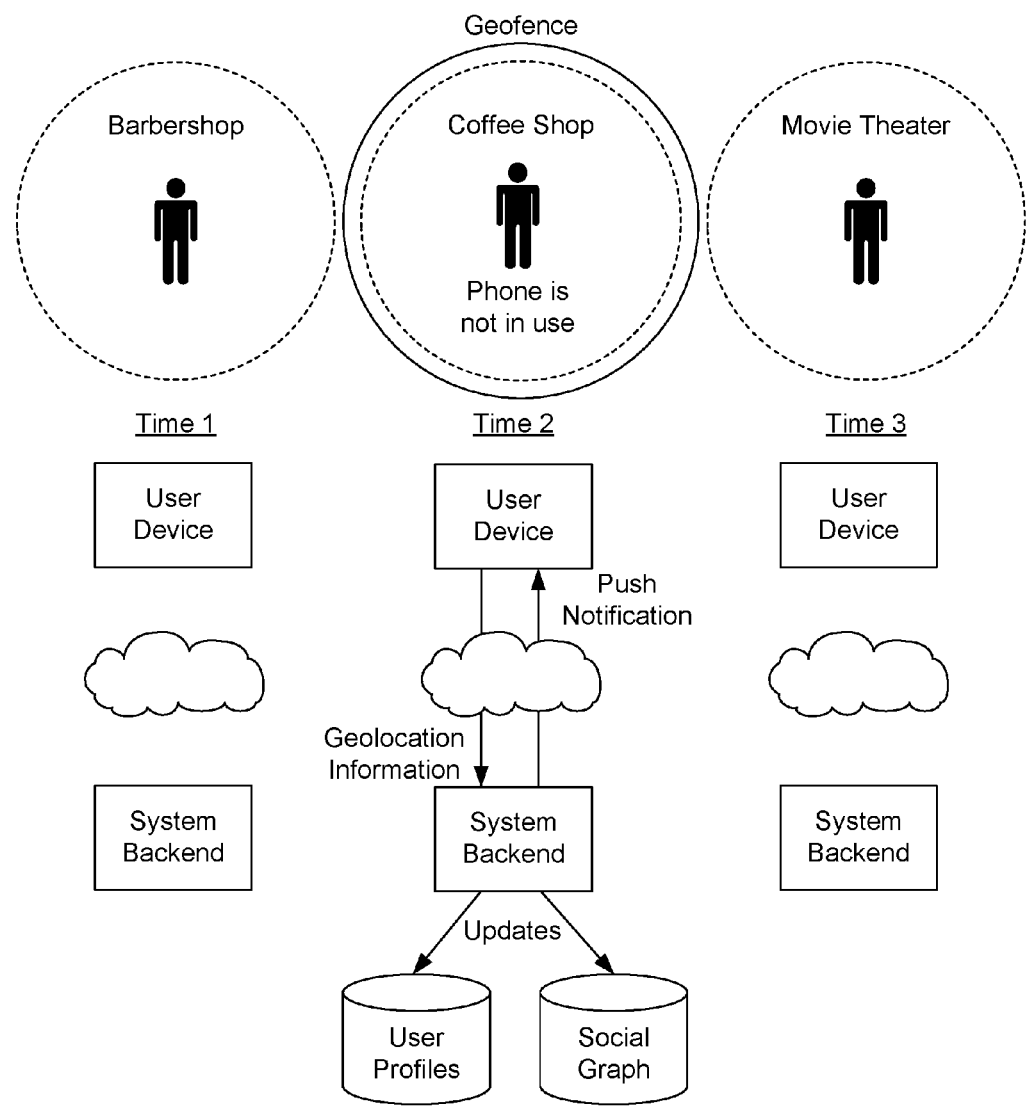
FIGS. 8A-8C show an example of capturing high-value geolocation targeting information with geofencing.

FIGS. 7A-7C and 8A-8C show how using geofencing instead of regular geolocation creates an additional value for advertising. FIGS. 7A-7C show an example of a scenario of capturing high-value geolocation targeting information without geofencing. FIGS. 8A-8C show a scenario of capturing high-value geolocation targeting information with geofencing.

Different location visits have different value for advertisement campaigns. For example, for a coffee shop advertisement campaign a visit of a coffee shop is of higher value than a visit of a next-door barbershop. As illustrated here, using geofencing (when high-value locations are actively and continuously monitored by the system) instead of regular geolocation collection (which is passive and intermittently opportunistic in its core) increases chances to collect high-value location visits that have a much higher probability of being relevant to the advertisement campaign and, thus, have more positive impact on the campaign targeting and, eventually, performance.

FIGS. 7A-7C show an example of capturing high-value geolocation targeting information without geofencing. In such a scenario, a user's device does not have any application that contains the system's geofencing SDK. There might be other system's SDKs integrated within applications installed on a user's device, such as an analytics SDK, an advertisement enabling SDK, or other SDKs used for other purposes. These SDKs might collect location information associated with in-app events that these SDKs capture or enable, such as events tagged by analytics SDK, ad serving events enabled by advertisement enabling SDK, or other events. It should be noticed that these non-geofencing SDKs can collect geolocation data only when the app is open on the user's phone (the user is actively using the app on the phone).

Even though geolocation capturing events by non-geofencing SDKs might accidentally occur when a user is inside or near a location that is of high value for an advertising campaign, such as a coffee shop for the coffee shop advertisement campaign, a probability of such coincidence is very low. The user has to interact with the right app at the right moment in the right place. When the user visits a high-value location, the phone may be in the user's pocket or the user may be active in an app without SDK capable of capturing geolocation information. As a result, many high-value geolocation events are not captured via non-geofencing SDKs and are lost for geo-targeting. The following example illustrates this situation:

Referring to FIG. 7A, at time 1, a user sitting at a barbershop and waiting for a haircut opens a game application on his phone. An event of opening a game is captured by a non-geofencing analytics SDK placed within the user's app. This SDK collects user geolocation at the moment of the event as one of attributes of the captured event, but this geolocation, a barbershop, is of low-value for a coffee shop campaign.

Referring to FIG. 7B, at time 2, the user enters a coffee shop. However, the user does not use the device at the coffee shop, or uses an app without partner SDK capable of capturing geolocation information. As a result, high-value geolocation information that the user visited a coffee shop cannot be collected. This is a missed opportunity for targeting or enriching the user's profile.

Referring to FIG. 7C, at time 3, after visiting a coffee shop, the user is sitting at a movie theater and waiting for a movie to start. The user opens the game application and resumes the game. An event of resuming a game is captured by the non-geofencing analytics SDK. This SDK collects user geolocation at the moment of the event as one of attributes of the captured event, but this geolocation, a movie theater, is again of low-value for a coffee shop campaign.

In the above scenario, no event was captured by the non-geofencing analytics SDK while the user was inside the coffee shop (or its vicinity). As a result, even though the SDK collected two low-value geolocations, it was unable to collect a high-value geolocation.

In order to increase probability of capturing high-value geolocation events, at least one app in the user's device should contain geo-fencing SDK, which is described below and shown in FIGS. 8A-8C.

FIGS. 8A-8C show an example of capturing high-value geolocation targeting information with geofencing. In such a scenario, the system's geofencing SDK is integrated within an app installed on user's device.

As a user enters a geofence created around a high-value location, such as a coffee shop, this geofence is triggered. As described in greater detail elsewhere in this application, the system's backend receives an alert that the geofence around a coffee shop has been entered, and the system's backend collects high-value geolocation information.

As described in greater detail elsewhere in this application, by using this high-value geolocation information, the system is able to deliver a real-time or a near real-time (within a short period of time from receiving geofencing alert) location relevant advertisement in a mobile device. In addition, the system is able to use this high value geolocation information to enrich the user's profile and social graph that will be used for delivering targeted advertisement or personalized content across different channels in the future. This example scenario shows:

Referring to FIG. 8A, at a time 1, a user is visiting a barbershop. Since a barbershop location is of low value for a coffee shop advertising campaign, no geofence is set around the barbershop, and, thus, no geolocation is sent by the system's geofencing SDK to the system's backend.

Referring to FIG. 8B, at a time 2, the user enters a coffee shop. Since a coffee shop location is of high value for a coffee shop advertisement campaign, a geofence was set around the coffee shop. As such, even if the app that contains geofencing SDK is closed or the phone is inactive, in the user's pocket, the system's backend still receives an alert that a geofence of the coffee shop has been entered, and the system's backend collects high-value geolocation.

By using this high-value geolocation information, the system delivers real-time geolocation relevant push notification message to the user's device. In addition, the system uses this high value geolocation information to enrich the user's profile and social graph that will be used for delivering targeted advertisement or personalized content across different channels in the future.

Referring to FIG. 8C, at a time 3, after visiting a coffee shop, the user goes to a movie theater. Since a movie theater location is of low value for a coffee shop advertisement campaign, no geofence is set around the movie theater, and, thus, no geolocation is sent by the system's geofencing SDK to the system's backend.

In this scenario, a high-value geolocation event was captured by the geofencing SDK, while two low-value geolocation events were ignored. The system can target the user with much higher accuracy due to the high-value geolocation information captured by geofence SDK.

Using Geofences for Delivering Targeted Advertisement or Personalized Content

In an implementation, the system determines how to use location information that it gathered for delivering targeted advertisement or personalized content, or both. This provides a method and system by which the geofence crossing signal triggers specific action or actions such as (a) immediate delivery of a push notification advertisement to the device (or an e-mail based advertisement), (b) update of user profile and social graph—that could be leveraged for (i) delivering targeted in-browser (web) or in-app advertisement or personalized content to the user in near-real time, while the user is still within or in the vicinity of the geofence, (ii) delivering targeted advertisement or personalized content to the user in the future, or (c) execution of other actions.

Figure 9:
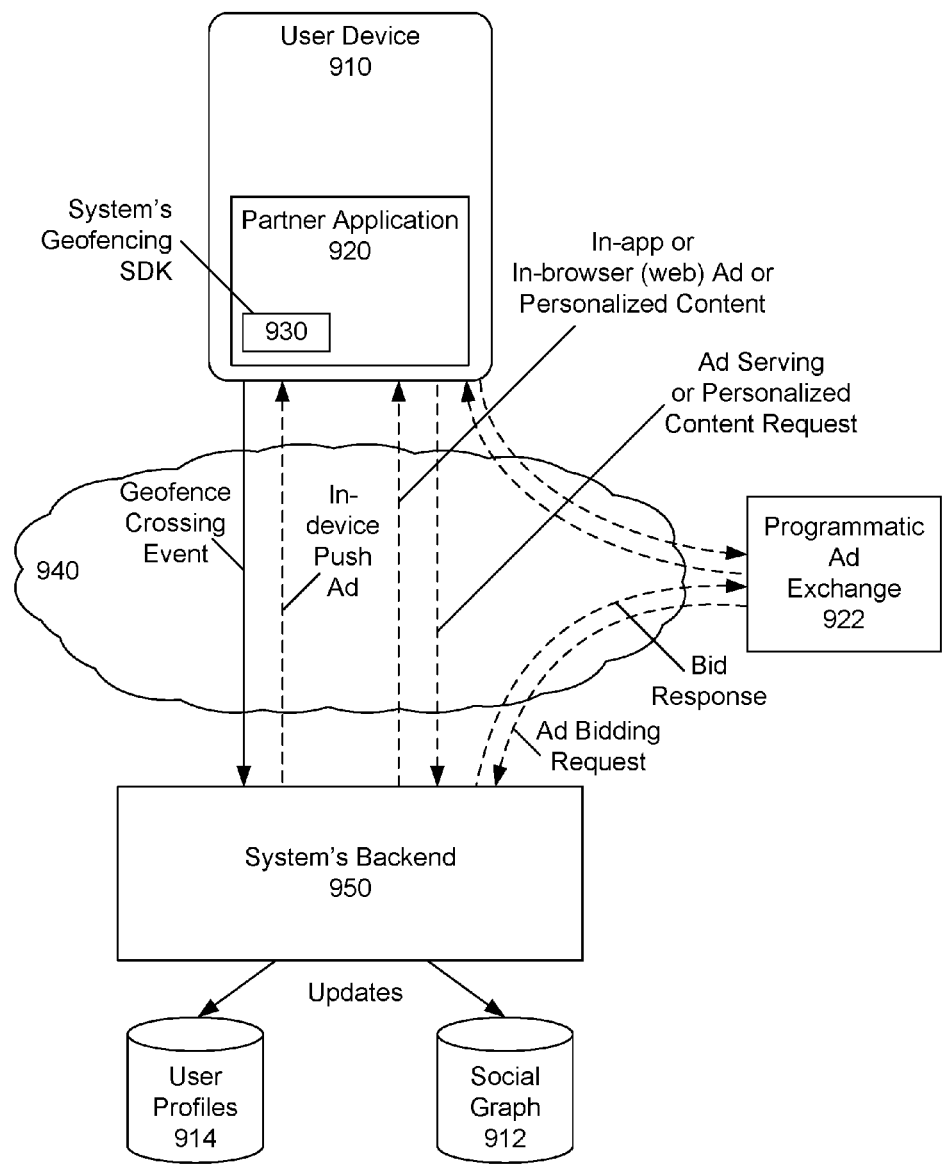
FIG. 9 provides a high-level overview of crossing a geofence by a device and following decisions made and actions taken by the system.

FIG. 9 provides a high-level overview of crossing a geofence by a device and following decisions made and actions taken by the system. A device 910 has entered a geofence area, and geofence crossing event is captured by a system's geofence SDK 930 integrated into a partner application 920 installed on device 910. Geofence crossing event information is transferred over a network 940 (e.g., Internet) to a system's backend 950. As described in greater detail elsewhere in this application, geofence crossing event information could contain device location information (latitude, longitude, and the like), geofence identifier, device identifier, and other information.

As described in greater detail elsewhere in this application, upon receiving geofence crossing event information the system's backend accesses various processing resources and data sources. These include a geofence signal ingestion module 1310 (FIG. 13), a user profile and social graph manager 1010 (FIG. 10), a user matching module 1016 (FIG. 10), and an advertisement module 1018 (FIG. 10), a geofence database 1350 (FIG. 13), a user profiles database 914 and a social graph 912, a user identification attributes storage 1017 (FIG. 10), and an advertising campaign data 1020 (FIG. 10), and others. In an implementation, the social graph (including links and nodes) and user profiles database does not include personally identifiable information.

The system's backend 950 then determines whether to trigger immediate or near real time advertisement or personalized content delivery to the user. The system also uses this geofence crossing event information to update user profiles database 914 and social graph 912 of the user. This helps the system to optimize present and future advertisement revenue and optimize the user's experience.

System Diagram

Figure 10:
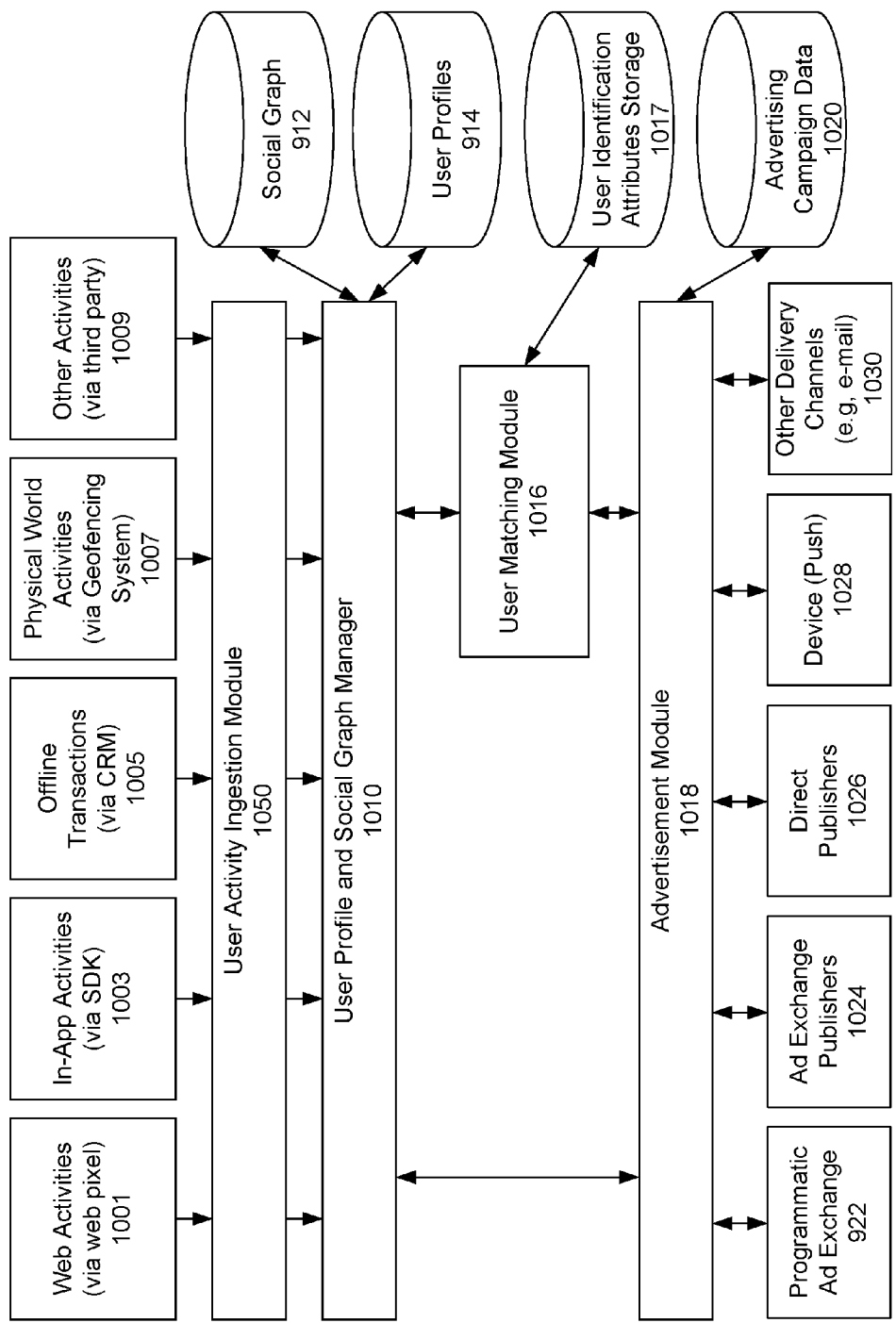
FIG. 10 shows a more detailed block diagram for a system used to select advertisements based on user location information.

FIG. 10 shows a more detailed block diagram for a system used to select advertisements based on user location information. The system receives user activity information from various sources. These include web activities 1001 (collected via web pixels), activities in mobile application or in-app activities 1003 (collected via system's SDK placed inside partner applications), offline transactions 1005 (collected via customer relationship management (CRM) technology), physical world activities 1007 (collected via geofencing system), and other activities 1009 (collected via various third parties).

A user activity ingestion module 1050 receives user activity information, performs various data cleansing and transformation operations, and sends cleansed and transformed user activity information to user profile and social graph manager 1010. User profile and social graph manager 1010 receives cleansed and transformed user activity information and makes appropriate updates in the user's social graph and user's profile stored inside social graph database 912 and user profiles database 914, respectively.

The user social graph contains information on how this user is related to other users of the system, as described in greater detail elsewhere in this application. The user profiles database stores a variety of user related information useful to cater the proper advertisements or personalized content to this user. For example, the user profiles database contains historical web page visit information, historical information related to advertisements delivered to the user (such as advertisement impressions, clicks, and conversions), historical location information 1012 (FIG. 13) (location profiles), or user interests according to categories tracked by the system, or any combination of these.

An advertisement module 1018 is coupled to an advertising campaign data database 1020. The system uses the module to select highly targeted advertisements presented to online users as well as to form the most optimal bidding prices that are sent as part of bidding responses to bidding requests received from programmatic ad exchanges. The advertisement module can deliver advertisement to online users (a) via programmatic ad exchanges 922 on web sites or inside mobile applications of ad exchange publishers 1024, (b) on web sites or inside mobile applications of direct publishers 1026, (c) directly to users' devices via push notification 1028, or (d) via other delivery channels (e.g., e-mail) 1030. As described elsewhere in this application, the system can select one or more methods to deliver an advertisement to a user.

For selecting and delivering highly targeted personalized content to online users personalized content module, similar to advertisement module 1018, should be used. Personalized content module should be coupled with personalized content data database. For simplicity of presentation, neither personalized content module nor personalized content database are shown in FIG. 10.

A user matching module 1016 is used by the system to identify (a) which user (or users) a particular piece of user activity information gathered by the system should be associated with, as well as (b) which user (or users) a particular ad bidding request or ad serving request received by the advertisement module 1018 (or personalized content serving request received by the personalized content module) should be associated with. User matching module 1016 is coupled to user identification attributes storage 1017, which stores various identifiers for each user of the system as well as various device fingerprinting attributes associated with each user identifier. As described in greater detail elsewhere in this application, the system matches (a) user activity information received to a particular online user, so that the system can update user information maintained by the system, as well as (b) an ad bidding request or ad serving request (or personalized content serving request) received to a particular online user, so that the system can select most appropriate or best advertisement (or personalized content) and the most optimal bidding price.

Enhancing User Profile and Social Graph with User Activity Information

In an implementation, in FIG. 10, user activity information is separated into five categories:

1. A first category, web activities 1001, includes users' interactions with web sites. This can include the following information: how long a user spends on a particular web site, which web pages a user visited, the time of a web page visit, how long a user spends on a web page, from what web site or web page the user navigated to a particular page, what searches lead user to a particular web page, what searches user did on a web page, or any combination of these. This information could be captured, for example, by leveraging web pixel (and cookie) technologies deployed on web sites.

2. A second category, activities in mobile application (or in-app activities) 1003, includes users' interactions with applications installed on their mobile devices. Similar to web activities, this includes the following information: how long a user spends in a particular application, which application pages a user visited, the time of an application page visit, how long a user spends on an application page, what other activities user did on a particular application page, or any combination of these. This information could be captured, for example, by leveraging SDK technologies deployed inside applications.

3. A third category, user offline transactions 1005, includes user's in-store and other commercial transactions captured via CRM technologies. Some examples of useful offline transaction information include various products and services a user purchased, stores a user visited, various information related to of marketing efforts directed towards a user, or any combination of these.

4. A forth category, user activities in the physical world 1007, includes user activities that provide information gathered from users' interactions with geofences or other location information in the system. In particular, information collected when user devices interact with geofences, called geofence (crossing) event information throughout this application, can include device location information (e.g., latitude, longitude, altitude, and speed), geofence interaction information (e.g., geofence identifier, geofence entering event, geofence exiting event, and time spent inside geofence), device identifier (e.g., Identifier for Advertising (IDFA) for iOS devices or Advertising Identifier from Android devices), and other information. Device location information could be obtained from the device operating system or other source (e.g., proximity, geographical geofences). The system can also calculate some elements of device location information.

5. A fifth category, other user activities 1009, includes various user activities associated with data acquired via third party (e.g., data purchased on various data exchanges or directly from various data vendors)

User activity data captured as described above is then passed to user activity ingestion module 1050. The purpose of this module is to perform various data cleansing and transformation operations. Cleansed and transformed user activity data is then passed to user profile and social graph manager 1010.

Figure 13:
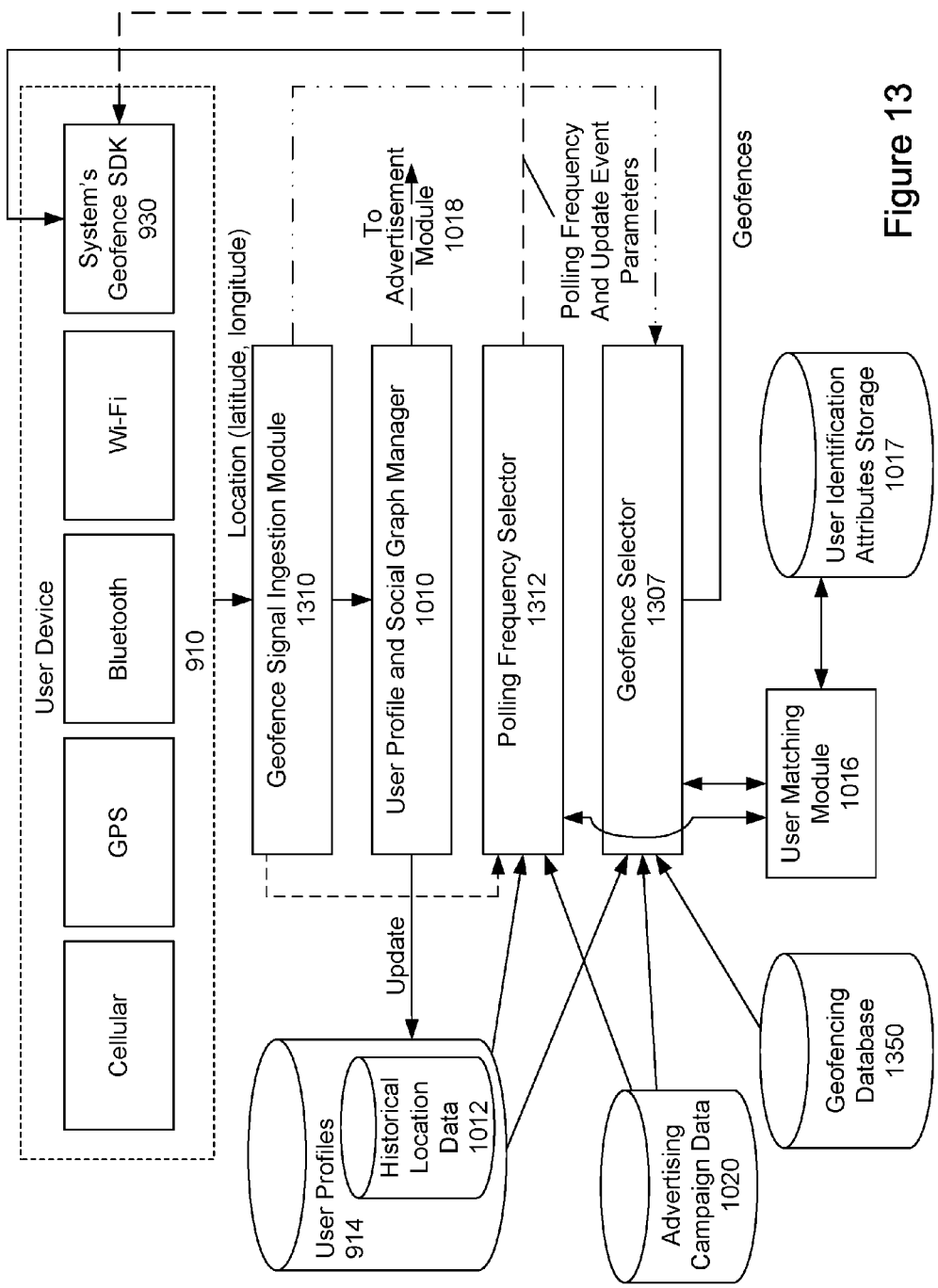
FIG. 13 shows a more detailed diagram for a system used to refresh geofences update frequencies on a device.

In an implementation, user activity ingestion module 1050 contains geofence signal ingestion module 1310 (FIG. 13). Referring to FIG. 13, geofence signal ingestion module 1310 cleanses and makes transformations of received geofence crossing event information. Information included in geofence crossing event information is described in greater detail elsewhere in this application. For example, by leveraging geofence database 1350, geofence signal ingestion module 1310 converts geofence ID to (a) geolocation, such as latitude and longitude information, zip code, or city, or any combination of these, and (b) a geocategory, such as Joe's coffee shop, Walgreens pharmacy, Farmers Market in San Mateo, or others.

Returning to FIG. 10, a purpose of user profile and social graph manager 1010 is to keep user profiles and social graph up to date by leveraging collected user activity data. Within this module, the collected activity data is used for (a) building new user profiles and adding nodes and edges to the social graph for new users and (b) updating existing user profiles and nodes and edges of the social graph for existing users.

In an implementation, the system includes anonymous user profiles that may contain various user activity histories at various levels of aggregation as well as user attributes, such as user demographic characteristics as well as user current and recent interests and intents. When a user profile is created, a unique but anonymous user ID is generated and assigned to the profile. User IDs are generated in the user matching module 1016 as described elsewhere in this application. This user ID does not change throughout the entire profile life and always uniquely but anonymously identifies this profile.

In an implementation, the system includes a social graph. An example of a social graph used with the system is RadiumOne's ShareGraph. The system builds the social graph by monitoring users of the Internet or Web or inside mobile applications as they surf the Web or interact with mobile applications (e.g., reading news, searching for information, shopping, and so forth). This monitoring occurs without regard to whether the users are logged into a membership site (e.g., Facebook, pay sites, and others), which may be referred to as the open Web or open Internet. More information on ShareGraph can be found in U.S. patent application Ser. No. 13/526,288, filed Jun. 18, 2012, issued as U.S. Pat. No. 8,751,621 on Jun. 10, 2014, which is incorporated by reference along with all other references cited in this application.

In the social graph, nodes represent users and edges represent connections or interactions between two users. Each node is uniquely but anonymously identified by the user ID uniquely associated with the user profile of the user represented by the node. An edge between two nodes in the social graph—a connection between two users—represents both context (or category) and strength. For two users, there could be several edges each representing a different category, and each having its own strength. Defined in such way, the social graph is technically speaking a weighted multigraph.

Using the example of RadiumOne's ShareGraph, to assess strength of a connection between two users related to a category, RadiumOne collects all available interactions between these users—with context that belongs to the category—and applies RadiumOne algorithms. The algorithms take into consideration types of interactions, their frequency, recency, directionality, and so forth. The social graph tracks kind of interest or intent the users are sharing. For example, when user A sends user B an article on Android phones or link to a coupon for www.elitetoystore.com or other URL or link, this means there is a shared interest or intent in Androids or toys. This is highly valuable information, especially for ad targeting.

In an implementation, the Apache Hadoop software library is a framework that allows for the distributed processing of large data sets across clusters of computers using a simple programming model. It is designed to scale up from single servers to thousands of machines, each offering local computation and storage. Rather than rely on hardware to deliver high-availability, the library itself is designed to detect and handle failures at the application layer, so delivering a highly-available service on top of a cluster of computers, each of which may be prone to failures. See hadoop.apache.org for more information, which is incorporated by reference.

Referring to FIG. 10, when the user profile and social graph module 1010 receives user activity data, before updating existing or creating new user profiles, social graph nodes, and social graph edges, this module needs first to either (a) match received activity data to existing user profiles, social graph nodes, social graph edges, or (b) determine that no user profile, social graph node, social graph edge exists that matches received user activity data. For this purpose, received user activity data (or some elements of it) is forwarded to a user matching module 1016.

As described elsewhere in this application, user matching module 1016 attempts to match received activity data to existing user IDs. If the module is unable to match received user activity data to existing user IDs, it generates or creates a new user ID or IDs. As a result, the user matching module 1016 returns user IDs (either previously existed or newly generated) associated with received user activity data (as well as probabilities that this activity is performed by these user IDs) to the user profile and social graph module 1010.

In an implementation, when building user profiles that indicate user interests and intent, the system collects both (a) geofence crossing event or geolocation information and (b) data from other sources. Adding data from other sources helps to refine insights obtained from geofence crossing event or geolocation information. For example, this allows advertisers to focus their efforts on users that have expressed interest in something in the store, but have not purchased anything yet. In an example, if a user enters a furniture store, the system knows there is a high probability that the user is interested in purchasing furniture. The system can process information from customer relationship management software operated by the furniture store, to determine that the user did not make a purchase during this visit to the store. The system stores this information and decides that this is a high value lead since the user shopped for (has an interest in) but ultimately did not purchase furniture during her visit.

In an implementation, the system uses geofence crossing event or geolocation information to enrich user profiles. Many profiles are built based on regular and mobile web, mobile app behaviors as well as offline transactions (captured via CRM), and geofence crossing event or geolocation information is great input for enriching already existing profiles. But people who do not shop online are usually more difficult to categorize. The system heavily leverages beacon and geographic geofence information to solve this problem. For example, a user regularly triggers beacons in the kids' section of Old Navy® (trademark of Gap Inc.) is a strong indicator to associate the user in the system with the "parents" category. A device triggering a beacon in Old Navy will create a signal that does not need to be used right away. Instead, the system uses this information to enrich the user profile (by adding the "parent" category to the profile) for future advertisement use. The signal is highly valuable when this signal does not exist online because the user does not typically shop for kids' clothes on the web.

Based on or as a result of geolocation information, the system can perform updates and other operations on social graph 912 and user profiles 914. A new node can be added to the social graph. For example, based on geolocation information, such as entering a geofence location, for the user (e.g., a mobile user) that cannot be found already existing in the social graph (e.g., through matching such as probabilistic or deterministic matching), a new node can be added to the social graph to represent the user. The user profile associated with the new node can be updated with the geolocation information. Subsequently, a link can be added between this new node and other nodes when sharing activity occurs with other users.

Another operation is updating an existing node in the social graph with additional information. For example, Based on or as a result of geolocation information, a user is matched to an existing node in the social graph. Then the node or its associated user profile, or both, are updated with information, such as geolocation or geofence information, which can improve ad targeting and content personalization.

Another operation is merging or combining nodes. For example, geolocation information indicates two or more nodes at the same location at similar times. Then these nodes can be matched and merged together to become a single node, instead of multiple nodes.

Another operation is adding an edge or link between nodes. For example, geolocation information indicates two or more nodes at the same location or a set of locations (e.g., first and second nodes are at locations 2, 6, and 8). An edge can be added between the two or more nodes. Additional factors in determining to adding an edge can include the frequency of the occurrence or that the occurrences are at similar or coordinated times. For example, the edge can be created when a frequency above a first threshold value.

A weighting to an existing edge can altered, increased or decreased, based on factors such as a frequency, such as above or below a second threshold value, number of occurrences, or number of locations matched. For example, as a number of a set of locations shared between two nodes increases, then the weighting of the edge increases. When two nodes have shown up (not necessarily at the same time) increases, for example, from three to four locations, the weighting of the edge between the nodes increase. The weighting can decrease over time. As time passes, the contribution of individual sharing activities to a particular edge will decrease.

For example, the more recently geolocation information is received messages are given a greater weight than older geolocation information. In an implementation, the system graph tracks time, and updates the weights of edges (e.g., reduces their value) when updating other edges between two nodes. Further, there can a periodically purge (e.g., monthly) of stale nodes and edges. For example, nodes and edges that have been inactive (based on geolocation information) more than a threshold amount of time or nodes and edges with weight (strength) falling below a certain threshold can be purged.

Serving Targeted Advertisements or Personalized Content

Referring to FIG. 10, the system includes an advertisement module 1018. The purpose of the advertisement module is to serve targeted ads to users by leveraging user predictive models based on user profiles and the social graph. The advertisement module buys advertising inventories (e.g., advertising space sold by publishers) on programmatic, real-time bidding (RTB), ad exchanges 922 as well as directly from publishers 1024. The advertisement module can also serve advertisement to the user's device via push notification 1028 or via other channels 1030 (e.g., e-mail).

Each user will receive an ad that is personalized based on their user profile. For example, a first user in the social graph will receive a first advertisement based on the first user profile, while a second user in the social graph will receive a second advertisement based on the second user profile. The first and second advertisements are different.

When making ad targeting decision, advertisement module 1018 takes into consideration effectiveness of various advertisement delivery channels for a specific user and specific context (user geographic location, media user is currently engaged with, user device, time of the day, day of the week, or others).

For example, advertisement module 1018 receives a bid request from a mobile ad exchange for an opportunity to serve an in-app advertisement to a user. If, based on user profile (user historical behavioral patterns and user history of ad engagements) and by leveraging predictive models, advertisement module 1018 concludes or determines that:

1. This user has much better chances to engage (and, as a result, better conversion rate) with an in-browser advertisement shown in her laptop.

2. On average, cost of in-browser, laptop-based advertising inventories, is lower than the cost of in-app advertising inventories.

3. There is a good chance that advertisement module 1018 will receive a bid request from a display ad exchange for an opportunity to serve an in-browser, laptop-based, advertisement to this user within next thirty minutes.

Then, in order to maximize conversion rate and minimize ad serving cost, advertisement module 1018 might decide not to bid (or bid very low price) on the present in-app ad serving opportunity and wait for in-browser, laptop-based, a serving opportunity.

In another example, as user enters a particular geofence, in order to engage the user right away advertisement module 1018 will choose between push notification and e-mail channels. Advertisement module 1018 will select a channel that maximizes conversion rate and minimizes ad serving cost, The decision will be based on user profile (e.g., user historical behavioral patterns and user history of ad engagements), user current context, and will leverage advertisement module's predictive models.

When advertisement module 1018 receives ad bidding requests from a programmatic advertisement exchange 922 or advertisement serving requests from a direct publisher 1026, as a first step, advertisement module 1018 obtains a user ID of the user associated with the ad bidding request or the ad serving request. Advertisement module 1018 might also obtain multiple user IDs together with probabilities that the ad-bidding request or the ad-serving request is associated with these user IDs.

In an implementation, advertisement module 1018 forwards the ad bidding request or ad serving request data (or some elements of it) to user matching module 1016. User matching module 1016 then attempts to match received data to existing user IDs. If a match or matches are found, user matching module 1016 returns the matched user IDs (as well as probabilities that the ad bidding request or ad serving request is associated with these user IDs) to advertisement module 1018. A more detailed description of matching executed by user matching module 1016 is provided elsewhere in this application.

Once the user IDs are obtained, advertisement module 1018 forwards these user IDs to the user profile and social graph module 1010 and requests users' profiles and social graphs, or both, associated with these user IDs from user profile and social graph module 1010. The user profile and social graph module 1010 selects and updates the users' profiles and social graphs, or both, associated with these IDs and returns these profiles and social graphs to advertisement module 1018.

Advertisement module 1018 uses the following factors to determine the best advertisement (e.g., the highest likelihood of generating a purchase from the advertiser) and the most optimal bidding price (in case of bidding request): (a) these user profiles and social graphs, (b) probabilities that the ad bidding request or ad serving request is associated with these user IDs, (c) contextual information (such as a current web or app page with which the user is engaged, current user geolocation, or other) received with the ad bidding or ad serving request, (d) advertising campaign data, or (e) any combination of these.

Advertisement module 1018 then serves the selected ad on the direct publisher's 1026 web or app page associated with the ad serving request, or returns the formed bid response to programmatic ad exchange 922, as appropriate. If the returned bid response wins the programmatic ad exchange's auction, the advertisement module serves the ad corresponding to the bid response on the exchange publisher's 1024 web or app page associated with the ad bidding request.

In an implementation, advertisement module 1018 can select an advertisement for a user in real-time or near real-time when geofence crossing event or location information is received. For example, if the user has entered into a coffee shop, the system can transmit an advertisement to the user on promotions from the coffee shop, from a nearby (competitor), or coffee sellers online. The system transmits the advertisement in near-real time, so that the user can take advantage of any offer included with the advertisement (e.g., purchase a bag of coffee using a coupon included with the advertisement).

In an implementation, advertisement module 1018 selects from one or more methods to display an advertisement to a user. This can occur in real-time or near real-time. For example, the system uses real-time push or custom real-time offer (e.g., displaying on a large screen at entrance of store) or real-time e-mail. As described in greater detail elsewhere in this application, the system can deliver targeted in-browser (web) or in-app advertisement to the user in near-real time, while the user is still in within or in the vicinity of the geofence—as soon as advertising module 1018 receives ad serving request from a direct publisher or ad bidding request from a programmatic exchange.

In another implementation, the system selects an advertisement for a user after geofence crossing event or location information is received. As discussed elsewhere in this application in greater detail, the system stores geolocation information as part of user profile and determine how to best use the information at later times. For example, the user has entered into an electronics store and has spent some time in the tablet device section of the store. At a later time, such as when the user is at home viewing an electronics web site, the system can transmit an advertisement for tablets to the user.

In an implementation, advertisement module 1018 determines what advertisements to transmit to a user, depending on location information gathered from the user in combination with other information gathered from the user, such as user's web activities, activities in mobile applications, offline transactions, user engagement with advertisement, and others. As described in greater detail elsewhere in this application, user profile and social graph manager 1010 integrates various sources of user information to produce a real-time rich profile of what a user is interested in. Using this profile, together with user current geolocation, advertisement module 1018 is able to determine the most relevant advertisements for a given user. By doing this, advertisement module 1018 decreases the overall costs of advertisement campaigns by reducing the likelihood that an advertisement is transmitted to a user who is not interested in advertised product or service.

For example, for a user that pays with a coffee store mobile application, this mobile transaction data can be very useful to see what type of drink the user usually buys. With this, advertisement module 1018 can determine whether it would be more relevant to up sell the user for a cappuccino, rather than trying to sell the user lattes.

In another example, a user goes to an electronics web site to check prices on brand X television. Later on, the user goes to brand X's retail location to buy another product at the store. When she enters the store, geofence crossing event information (captured via a beacon, GPS, or other) notifies the system of her entry. Advertisement module 1018 then delivers a message to the user "Avoid the shipping fee and purchase a Brand X TV in our store today!"

Very similar implementations could be used for serving targeted personalized context to online users. In these implementations personalized content module and personalized content data database should be used instead of advertisement module 1018 and advertising campaign data database 1020, respectively.

Identifying Users

Referring to FIG. 10, a purpose of the user matching module 1016 is (a) to match user data received by the system backend (e.g., user activity data received by user profile and social graph manager 1010) or ad bidding request or ad serving request data (or some elements of it) received by advertisement module 1018 or personalized content request data received by personalized content module to existing user IDs, or (b) determine that no user ID exists that matches received user data and then generate or create new unique but anonymous user ID. Various matching algorithms using a variety of features could be used in the user matching module 1016.

In a specific implementation, the system identifies a user uniquely but anonymously by user ID with the following characteristics. This can be a randomly generated but unique alphanumerical string that is assigned to a user profile or social graph node when the system first time processes this user's activity or event (such as viewing a web page, sharing a link, opening a mobile application, or receiving an ad bidding request).

This user ID is then stored in user identification attributes storage 1017. User identification attributes storage 1017 also stores various device fingerprinting attributes associated with this user ID: various device IDs (e.g., IDFAs from iOS, Advertising Identifiers from Android, or others) and their combinations and hashes, IP addresses, operating systems and browsers (e.g. type and version via a user agent field); or typical user navigational, geotemporal, and behavioral patterns, various personalized elements in the Web pages often visited by the user, various personalized elements of user device or browser configuration, such as browser window size, and others.

In an implementation, the system uses an advertising identifier generated by operating system of a device, to uniquely identify the device. Different operating systems can refer to this advertising identifier using different terms. For example, Google's Android refers to this as an Advertising ID, while Apple's iOS refers to this as an Identifier for Advertising (or IDFA). The advertising identifier is a device-specific, unique, resettable device ID used for advertising purposes. It gives users better controls and provides developers with a simple, standard system to identify devices. It is an anonymous device identifier used for advertising purposes, and often enables users to reset their identifier or opt out of interest-based advertisement.

When a user uses a browser that supports cookies, a user ID can also be stored in a browser cookie. Some browsers that support cookies include Microsoft's Internet Explorer, Google Chrome, and Mozilla Firefox.

When user matching module 1016 is processing user data received by the system backend, module 1016 attempts to attribute or match this received user data to one or several user IDs from user identification attributes storage 1017 as well as evaluate probabilities that this received user data belongs to these user IDs as described elsewhere in this application. If no user ID from user identification attributes storage 1017 could be attributed to the received user data with high enough probability (e.g., above certain threshold), a new user ID is generated by the system and:

1. This user ID is assigned to the received user data with probability 1.

2. This user ID is stored in user identification attributes storage 1017, together with the device fingerprinting attributes that were available in this received user data.

3. When a user uses a browser that supports cookies, a user ID is also stored in a browser cookie.

When user matching module 1016 attempts to attribute the received user data to one or several user IDs from user identification attributes storage 1017, as well as evaluate probabilities that the received user data is identified by these user IDs, module 1016 first checks if a cookie with user ID is available in the received user data.

1. If a cookie with the user ID is available in the received user data, the user matching module extracts user ID from the cookie. This user ID is then attributed to the received user data. The probability of the match is set to 1.

2. If a cookie with the user ID is not available in the received user data, user matching module 1016 extracts all device fingerprinting attributes that are available in the received user data. User matching module 416 then applies probabilistic fingerprinting algorithms to these attributes and calculates match probabilities—probabilities that this set of device fingerprinting attributes belongs to user IDs from user identification attributes storage 1017. User IDs from user identification attributes storage 1017 with the highest match probabilities—the match probabilities above certain thresholds—and associated match probabilities are then attributed to this received user data.

In an implementation, user matching module 1016 checks if a device ID or its known hash is present in the extracted fingerprinting attributes. And if it is present, whether it matches any of the device IDs or hashed device IDs stored in user identification attributes storage 1017. In case of a positive match, the user ID associated with the matched device ID or hashed device ID from user identification attributes storage 1017 is attributed to the received user data with probability 1.

In an implementation, some of the matching algorithms used in user matching module 1016 use location profiles to match users and devices. As discussed elsewhere in this application, the system's user profiles (stored in user profiles database or storage 914) include location profiles. User matching module 1016 uses location profiles in a variety of ways. For example, if two devices are often seen together at a certain time, the system can infer that there is some relationship between the devices. For example, when an Android smartphone's device ID and a Dell laptop's Chrome browser's cookie ID are often seen within the same geolocation after 6 p.m. during weekdays, the system can infer that both devices belong to the same user who uses both his smartphone and his laptop at home after work.

In an implementation, the system does not require personally identifiable information (PII) to build user profiles, social graph (e.g., ShareGraph), or select advertisements. Some examples of personally identifiable information includes, for example, name, such as full name, maiden name, mother's maiden name, or alias; address information, such as street address or e-mail address; mobile telephone; and credit card information. Personally identifiable information is information that can be used to uniquely identify, contact, or locate a single person or can be used with other sources to uniquely identify a single individual.

In contrast to personally identifiable information, nonpersonal information is information that is recorded about users so that it no longer reflects or references an individually identifiable user. Some examples of nonpersonal information include cookies, Web beacons, demographic information (e.g., zip code, age, gender, or interests), server log files, environmental variables (e.g., operating system, OS version, Internet browser, and screen resolution), and others.

Sample Flows

Figure 11A:
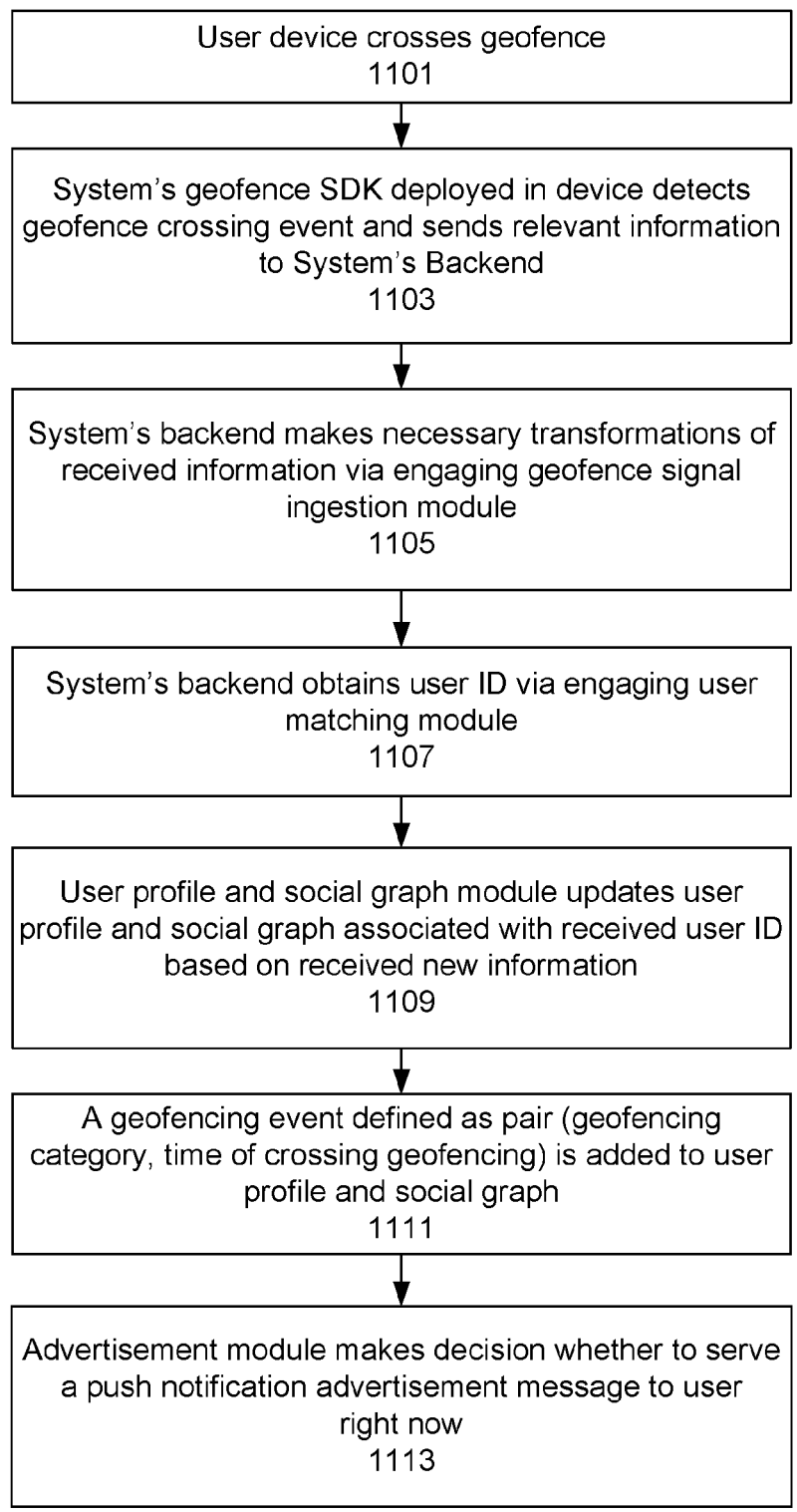
FIG. 11A show a sample flow for enhancing user profile and social graph with the data collected via geofencing.
Figure 11B:
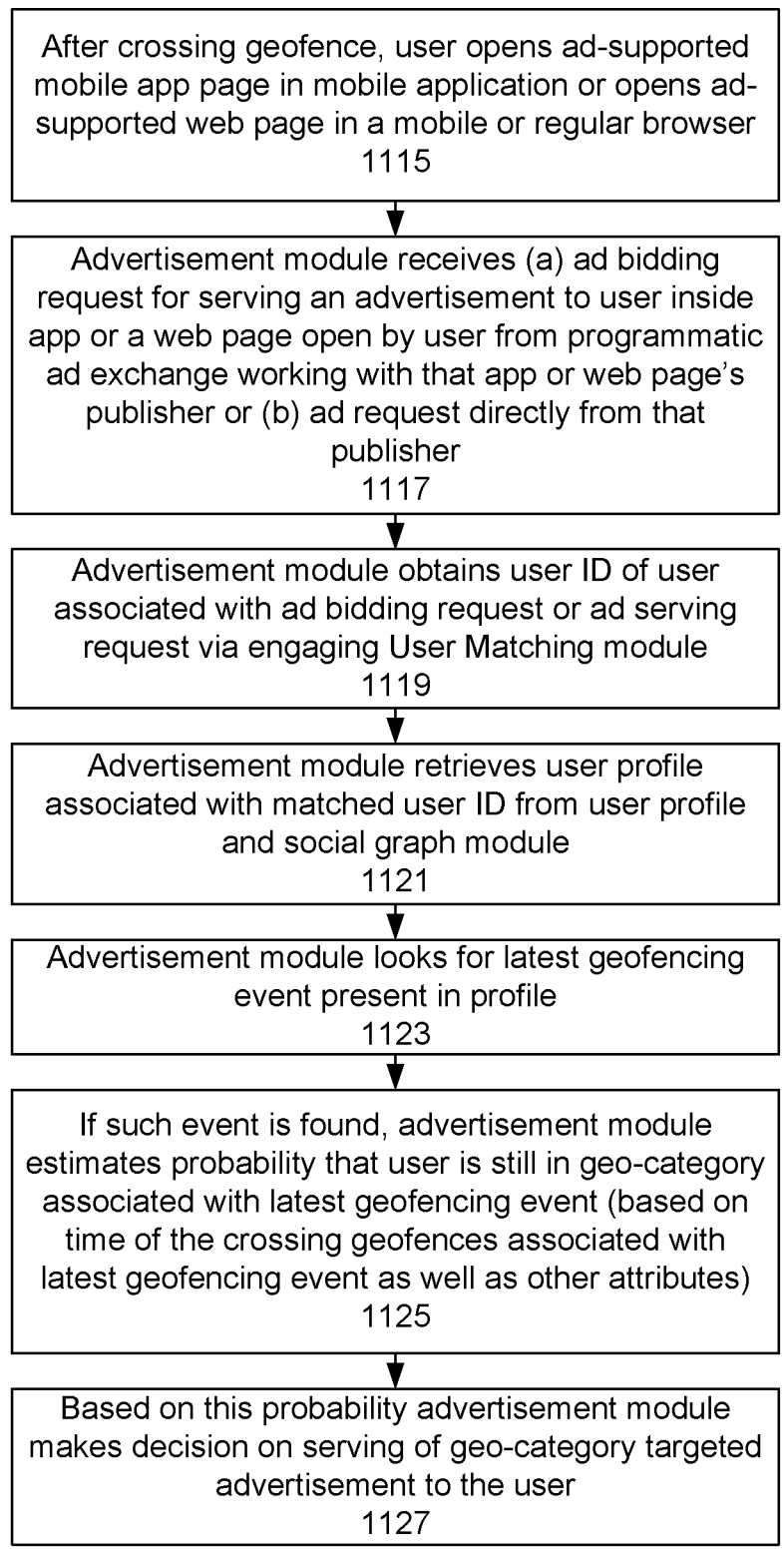
FIG. 11B show a sample flow for making decisions on serving targeted advertisements or personalized content based on the information collected via geofencing.

FIGS. 11A and 11B show sample flows for (a) enhancing user profile and social graph with the data collected via geofencing and (b) making decisions on serving targeted advertisements based on the information collected via geofencing.

FIG. 11A shows an sample flow for enhancing user profile and social graph with the data collected via geofencing and making a decision of serving immediate push notification advertisement:

In a step 1101, a user with a device crosses a geofence monitored by the device's operating system. A partner application installed on a user's device contains the system's geofencing SDK.

In a step 1103, as a user's device crosses a geofence, the system detects the geofence crossing event and sends geofence crossing event information (e.g., anonymous device ID, geofence ID, or other) to a backend of the system.

In a step 1105, the backend makes necessary transformations of received geofence crossing event information, such as converting geofence ID to geolocation and geocategory, via engaging a geofence signal ingestion module 1310 (FIG. 13) as described elsewhere in this application.

In a step 1107, the backend obtains a user ID via engaging the user matching module 1016 (FIG. 10) as described elsewhere in this application.

In a step 1109, user profile and social graph module 1010 (FIG. 10) updates user profile and social graph associated with the received user ID based on the received new information (e.g., geolocation, geocategory, or other).

In particular, user profile and social graph module 1010 (FIG. 10) stores the user location information to user profiles database 914 (FIG. 10). This allows the system to provide deeper insight into users, by analyzing not only what location information is gathered from the device at a given time, but also location information gathered from the device (or user across multiple devices) over a long period of time. The system determines user location patterns based on user historical location data 1012 (FIG. 13).

In a step 1111, in particular, a geofencing event defined as a pair of attributes (geofencing category, time of the crossing geofencing) is added to the user profile and social graph.

In a step 1113, once the user profile and social graph is updated, advertisement module 1018 (FIG. 10) makes a decision whether to serve a push notification (1028, FIG. 10) advertisement message to the user device right now. This decision is based on currently available advertisement campaigns, user's current geolocation and geocategory, current state of user profile (in particular strengths of user interests), current time of the days, or a combination of any of these.

If advertisement module 1018 (FIG. 10) makes a decision to transmit a push notification (1028, FIG. 10) advertisement message to the user device right now, it immediately transmits a selected push notification message to the user's device.

It should be noted that when the system transmits a push notification message (1028, FIG. 10) to the user's device, the user's device receives and displays push notification regardless of whether or not the partner application containing system's SDK enabling push notification is being executed on the device.

Also, system's SDK enabling push notification can be integrated in a partner's application different from a partner's application that contains system's geofencing SDK.

While the user is still within or in the vicinity of the geofence, the advertisement module 1018 (FIG. 10) may also serve geographically targeted advertisement or personalized content on the user's device via a mobile app or in the user's web browser. This is described in further detail with the following flow.

FIG. 11B shows a sample flow for making a decision on serving targeted in-browser (web) and in-app advertisements based on the information collected via geofencing:

In a step 1115, after crossing a geofence, the user opens an ad-supported mobile app-page in a mobile application or opens an ad-supported web-page in a mobile or regular browser. By that time, the system has already received and processed information associated with the geofence crossing event (e.g., using the flow described in FIG. 11A above).

In a step 1117, advertisement module 1018 (FIG. 10) then receives (a) a request for a bid to serve an advertisement to the user inside the app- or web-page open by the user (ad biding request) from programmatic ad exchange 922 (FIG. 10) working with that app- or web-page's publisher 1024 (FIG. 10) or (b) a request to serve an advertisement (ad serving request) directly from that app- or web-page's publisher 1026 (FIG. 10).

In a step 1119, advertisement module 1018 (FIG. 10) obtains a user ID of the user associated with the ad bidding request or the ad serving request via engaging user matching module 1016 (FIG. 10) as described elsewhere in this application.

In a step 1121, once the user ID is obtained, advertisement module 1018 (FIG. 10) retrieves user profile associated with matched user ID from user profile and social graph module 1010 (FIG. 10) as described elsewhere in this application.

In a step 1123, then advertisement module 1018 (FIG. 10) looks for the latest geofencing event present in the profile.

In a step 1125, if such an event is found, advertisement module 1018 (FIG. 10) estimates the probability that the user is still in geocategory associated with the latest geofencing event (e.g., the user is inside or near the geofence associated with the latest geofencing event). This probability estimate is based on the time of the crossing geofences associated with the latest geofencing event as well as other attributes.

In a step 1127, based on this probability advertisement module 1018 (FIG. 10) makes a decision on serving geocategory targeted advertisement to the user.

If advertisement module 1018 (FIG. 10) decides to serve geocategory targeted advertisement and selects corresponding advertisement (and forms a bid price in case of ad bidding request), advertisement module 1018 serves the selected advertisement on the direct publisher's 1026 (FIG. 10) app- or web-page associated with the ad serving request or returns the formed bid response to programmatic ad exchange 922 (FIG. 10), as appropriate. If the returned bid response wins the programmatic ad exchange's auction, advertisement module 1018 (FIG. 10) serves the ad corresponding to the bid response on the exchange publisher's 1024 (FIG. 10) app or web-page associated with the ad bidding request.

In an implementation, the system supports cross-platform or cross-channel operations. Advertisements are transmitted to users using different platforms or channels from the platforms or channels used to generate user location information.

As an example, different devices can be used for gathering location information and serving targeted advertisements or personalized content based on this information. For example, geofencing signal coming from a mobile phone is used for updating a device agnostic user profile. Later on, the information contributed by this geofencing signal to the user profile triggers delivery of a desktop ad to the user as soon as the system's advertising module 1018 (FIG. 10) receives ad serving request from a desktop web publisher.

In an example, a user's visit of the vitamin aisle of a pharmacy, captured via the user's mobile phone and a beacon geofence, later on triggers an ad for vitamins on the user's desktop web browser.

In another example, the same device that location information is gathered from is also used to transmit an advertisement but through another platform such as e-mail or a web browser.

In an implementation, an application installed on a user's device using the system's geofencing SDK can be used to deliver an advertisement to the user. The advertisement can be an in-app advertisement (when an application is open) or push (when application is closed). More than one application using the system's SDK can be installed on the device.

In a first example, first and second applications are installed on the user's device. The first application determines geolocation information for the device and is used to deliver the advertisement to the user. In a second example, first and second applications are installed on the user's device. The first application determines geolocation information for the device and the second application is used to deliver the advertisement to the user.

The system can be used to drive foot traffic to different areas in a physical location by using a combination of geofences. For example, a GPS-based geofence can be placed around a retail store with a radius larger than the physical location itself, say five hundred meters. Another beacon-based geofence can be placed at the entrance of the store. When a device crosses the outer geofence, the system can trigger a campaign to drive foot traffic until the second inner geofence is crossed. Then a push notification is triggered: for example, the push notification may state "you have shown interest in Samsung® TVs on the web, we have some right now in our Best Buy store!" Samsung is a trademark of Samsung Electronics Co., Ltd.

Managing Geofences

In an implementation, the system uses various techniques to manage geofences and refresh them regularly on a user's device. Updates of the set of geofences being monitored by a device, both polling (or update) frequencies and lists of geofences included in the updates, are determined by ever changing factors such as user locations, the full set of geofences registered in the system's backend, advertising campaign settings, and other factors, and any combination of these. These geofence management techniques, including active polling logic and geofence distribution logic are discussed in greater detail below.

Figure 12:
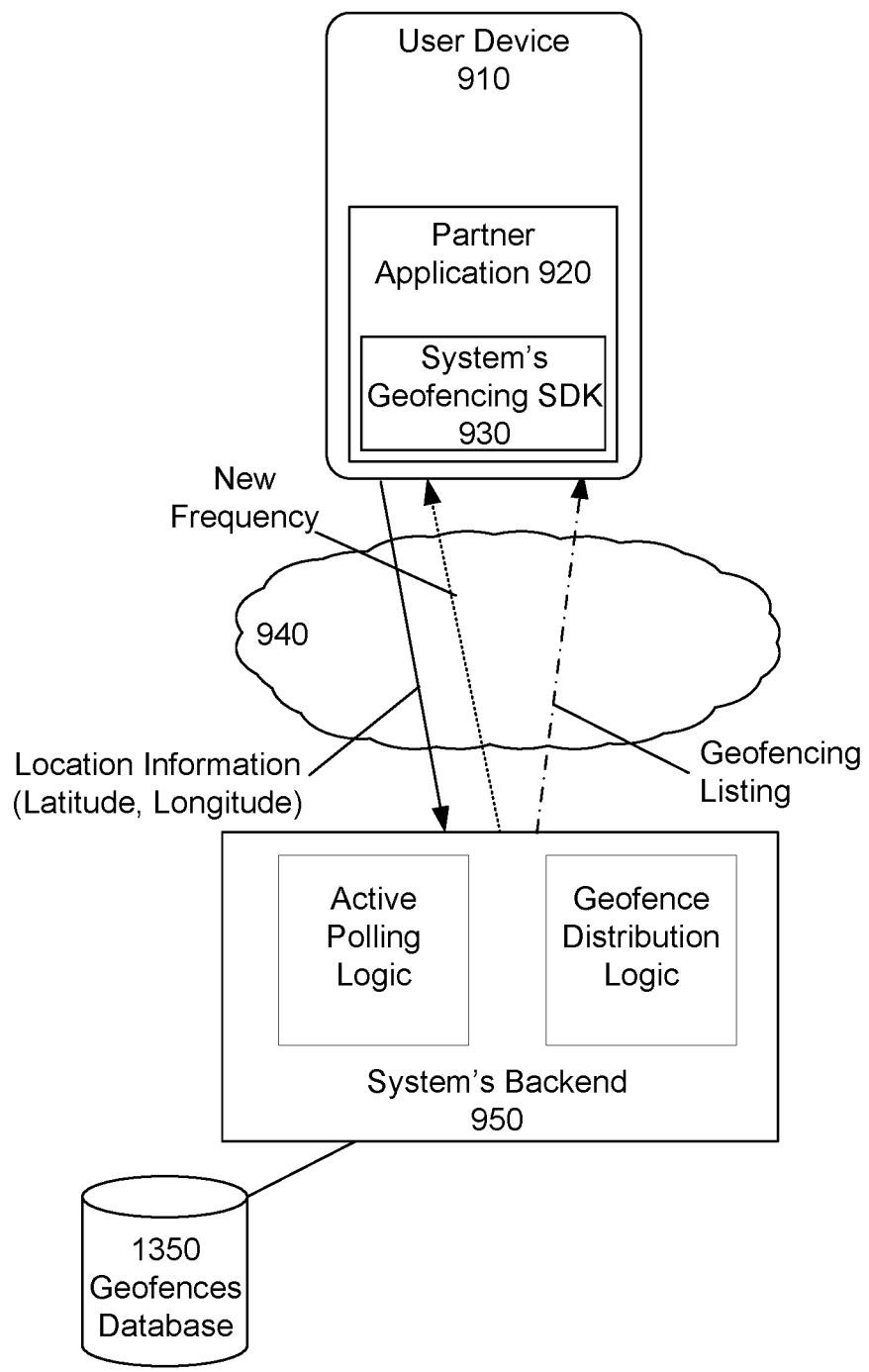
FIG. 12 shows a system view of updating a geofence listing and polling frequency on a device.

FIG. 12 shows a system view of updating a geofence listing and polling frequency on a device. At the moment of update, triggered by a polling event (a heartbeat event or a special update event, discussed in greater detail elsewhere in this application), the system's geofence SDK 930 installed as part of partner application 920 on device 910 connects with the system's backend 950 via a network 940 (e.g., Internet). The system's geofence SDK 930 then sends location information (latitude, longitude, and the like), discussed in greater detail elsewhere in the application, device ID, and a request for geofence update, to the system's backend 950.

Upon receiving the location information, device ID, and geofence update request, the system's backend 950 (a) using geofence distribution logic, discussed elsewhere in this application, selects geofences, (b) using active polling logic, discussed elsewhere in this application, selects heartbeat frequencies and special update event parameters, and (c) transfers selected list of geofences together with heartbeat frequencies and special update event parameters to the system's geofence SDK 930. The selection of geofences is made from a database of geofences 1350 maintained by the system's backend 950.

FIG. 13 shows a more detailed diagram for a system used to refresh geofences and update frequencies on a device. A user device 910 includes various radios: cellular, GPS, Bluetooth, Wi-Fi, and others, and any combination of these. These radios can be provided by an operating system installed on the device and could be used by the device for obtaining location information (latitude, longitude, and the like), as discussed elsewhere in this application. The system's geofence SDK 930, installed as part of a partner application on the device, is connected to a system's backend geofencing server through a network connection.

At the moment of update, triggered by a polling event (e.g., a heartbeat event or a special update event, discussed in greater detail elsewhere in this application), the system's geofence SDK 930 connects with the system's backend via a network (e.g., Internet) and sends location information (latitude, longitude, and the like), discussed in greater detail elsewhere in the application, device ID, and a request for geofence update to the system's backend.

The system's backend makes necessary transformations of received information via engaging geofence signal ingestion module 1310, as described in greater detail elsewhere in this application.

The transformed location information, together with the device ID, is passed to user profile and social graph manager 1010. As described elsewhere in this application, user profile and social graph manager 1010 stores the location information to user profiles database 914. The transformed location information, together with the device ID, is also passed to geofence selector 1307 and a polling frequency selector 1312.

Geofence selector 1307 selects new geofences to be monitored by the user device. The selection of new geofences is made from a database of geofences 1350 maintained by the system's backend.

Polling frequency selector 1312 selects a new heartbeat frequency and special update event parameters. Polling frequency selector 1312 can define two types of polling events (e.g., events that trigger refresh process): heartbeat events and special update events. Heartbeat events are internal system events generated by the SDK at regular time intervals (e.g., every five minutes, every ten minutes, every fifteen minutes, or other time periods). Special update events are external events captured by the SDK such as geofence crossing by the device, "large location update" notification by the device (a notification generated by certain operating systems, e.g., Apple's iOS, when the device moves a significant amount of distance), or others.

To determine a new sets of geofences to be monitored by the device and a new heartbeat frequency and special update event parameters, geofence selector 1307 and polling frequency selector 1312, respectively, solve optimization problems with the goal of maximizing the device battery life and maximizing a likelihood that at the moment high-value geofences are being crossed they are monitored by the device (and, thus, maximizing potential advertisement revenues).

To make selection decisions, geofence selector 1307 and polling frequency selector 1312 use various data resources maintained by the system's backend. They use current user location information just received from the SDK as well as user location patterns derived from user historical location data 1012 and stored in user profiles database 914. The geofence selector 1307 and polling frequency selector 1312 also leverage user historical activity data 1012, as well as user current interests, intents, and other user profile attributes stored in user profiles database 914. The geofence selector 1307 and polling frequency selector 1312 also leverage advertising campaign data stored in advertising campaign data database 1020 as well as user's history of engagement with advertising campaigns stored in user profiles database 914 in order to make the selection of geofences most relevant to advertising needs.

To provide some examples, the following advertising campaign related information could be used by geofence selector 1307: previous history of the user's engagement with advertising campaigns, including advertising impressions, clicks, conversions, whether a frequency cap (e.g., maximum number of campaign advertising impressions allowed to be served to a user per a period of time) is reached for the user for an advertising campaign (e.g., if a cap is reached then geofences associated with the campaign might be deactivated), various campaign-wide delivery and targeting constraints (e.g., various caps and pacing requirements—limitations on a total number of campaign ad impressions allowed to be delivered during a period of time—or geolocation, temporal, or audience filters—disallowing delivery of campaign ad impression to users in specific geolocations, during specific times of day or days of week, or belonging to specific segments or audiences), start date of an advertisement campaign, remaining length of an advertisement campaign, remaining budget of an advertisement campaign, cost of an advertisement impression, and other information.

In order to use user-related data described above, geofence selector 1307 and polling frequency selector 1312 obtain a user identifier associated with the received device ID. As described in greater detail elsewhere in this application, geofence selector 1307 and polling frequency selector 1312 receive user identifier from user matching module 1016 after they forward the device ID to this module.

In implementation, once geofences are selected by geofence selector 1307, a list of selected geofences is transmitted to the device 910. This new list replaces any previous geofence list residing on the device. The device 910 begins monitoring the new list of geofences.

In implementation, once a new heartbeat frequency and special update event parameters are selected by polling frequency selector 1312, they are transmitted to device 910. This new heartbeat frequency and special update event parameters replace any previous heartbeat frequency and special update event parameters residing on the device. Device 910 begins using the new heartbeat frequency and special update event parameters.

Active Polling Logic

The system uses a variety of factors to determine the heartbeat frequency. The system can use one or more of these factors:

1. The system determines that there are few or no geofences in a given area the user is in. The system increases the time before new geofences are determined for a user. For example, the system's backend determines that the density of geofences around the user is low. The system uses the number of miles between the current location of the user and the nearest geofence and speed of the user to determine the new heartbeat frequency, reducing update frequency and, thus, prolonging battery life, but still limiting the probability of crossing a geofence without the device being loaded with this geofence.

2. The system determines more than one geofence has been entered and exited within a short period of time. If these geofences are fairly close to each other, this indicates to the system that a user is likely staying within the confine of a high geofence density area (e.g., a mall for example). Since the system knows that the user is moving but stays in the same area, the system can decrease heartbeat frequency and, thus, increase the time before new geofences are determined through active polling.

3. The system determines a user is at a special category of location. Some of these categories include airports or highways. For example, if a user triggers a geofence at an airport, the system can update the heartbeat frequency to a value consistent with the average flight time at this airport. It will guarantee that the system will produce a heartbeat at the destination within a reasonable amount of time, while limiting the number of heartbeats triggered during transit. As another example, if the user is on a highway, the system can update the heartbeat frequency to a value consistent with the time to reach the next metropolitan area in the direction of travel.

4. The system determines a direction a user is likely traveling. If there are few geofences in the direction the user is traveling, the system decreases the heartbeat frequency and thus increases the time before geofences are updated on the device.

5. The system determines patterns using historical geolocation information for a given user. This information is used by the system to determine types of locations (or location profiles) for particular users. For example, if a certain user is within a certain geofence at a given time of the day, the system can infer that the geofence corresponds to a certain location for a user with the device. For example, if the system determines that after 10 p.m. daily a device is within a particular geofence, the system can infer that this is a home of the device's user. In another example, if the system determines that from 9 a.m. till evening a device is within a particular geofence on weekdays, the system can infer that this is a workplace of the device's user.

Based on the different profiles, the system can decrease or increase the heartbeat frequency. For example, if the user is at a work location, the system decreases the heartbeat frequency and, thus, increases the time before geofences are updated on the device. The system can also adjust when geofences should be updated, by predicting when the user will be moving again (e.g., when they get off work).

6. The system receives from a device that a "large location update" is enabled. This is a feature of certain operating systems (e.g., Apple's iOS) that will notify the system when the device moves a significant amount of distance. When this occurs, the system will reduce the heartbeat frequency or turn-off the refreshing of geofences on the device, until the large location update is received.

In an implementation, various pieces of information are gathered from a device by the system's SDK when a refresh frequency is reached. This information, called device location information, includes device latitude, longitude, altitude, speed, direction, and others, as described in greater detail elsewhere in this application.

In an implementation, the system uses crossing of active geofence events as a special update event. A geofence refresh occurs in the system when an active geofence is triggered (e.g., entering or exiting an active geofence) by a device. When this occurs, location information from the device is gathered and an update for new geofences and new heartbeat frequency and special update event parameters is made.

In an implementation, the system uses crossing of special (control) geofence events as a special update event. If, for example, the geofence distribution is sparse around the user, the system sets a low heartbeat frequency value (e.g., one day) and sets a special (or control) geofence (as opposed to an "active geofence") around the user. This control geofence encompasses a relatively large area around the user where there is no active geofence. If the user does not cross this control geofence, it means the user is within the boundaries of that no active-geofence zone, limiting the immediate need for an updated set of geofences to be uploaded on the device and thus, for increasing heartbeat frequency.

Once the user crosses the control geofence, the system's SDK captures the control geofence crossing event. The control geofence crossing event serves as a special update event and triggers increase of the heartbeat frequency. Meanwhile, since polling was reduced the entire time the user was in the control geofence area, battery consumption was minimal.

FIGS. 14A-14E show sample scenarios of using large control geofences to adjust a heartbeat frequency.

FIG. 14A shows seven geofences in an example area. There are six active geofences 1406, meaning that they correspond to active advertisement campaigns currently in the system, or soon-to-be-started or frequently run advertisement campaigns, or to high-value categories that might help targeting future advertisement campaigns. There is also a control geofence 1423. The control geofence is not necessarily tied to an advertising campaign, but assists the system in determining a special update event.

FIG. 14B shows the control geofence being registered on the device. The system decreases a heartbeat frequency (e.g., turn off heartbeat frequency or make heartbeat frequency extremely low).

FIG. 14C shows the device moving within the boundaries of the control geofence. The control geofence is still the only geofence registered on the device. No new geofences are registered while device stays within the control geofence.

FIG. 14D shows the device exiting the control geofence. The system's SDK captures special update event (crossing control geofence by the device). This special update event causes the system's SDK to register two active geofences, deregister the control geofence, and increases the heartbeat frequency.

FIG. 14E shows the device with two new geofences registered (and two previous geofences deregistered), as the device continues to move. This update was possible thanks to the increased heartbeat frequency. With active polling on, when the device changes location, a new set of more relevant geofences is quickly registered on the device.

Geofence Distribution Logic

The system uses a variety of factors to determine what geofences to select. The system can use one or more of these factors, and in any combination:

1. The system collects from an operating system of the device the device coordinates. In an implementation, geofences that have their center closest to the device coordinates are chosen.

2. The system finds a user profile associated with a device identifier in user profiles database 914 (FIG. 13) to determine what advertisements have been shown recently to the user. The system tries not to send the same advertisements or advertisement categories to a user too frequently. For example, the system tracks a number of times an advertisement or advertisement category has been sent to the user over a given time period. The given time period can be a rolling time period such as the last hour, two hours, three hours, four hours, one day, two days, and other time periods. If an advertisement or advertisement category has already been sent to the user over a threshold amount of times for the given amount of time, the system will not send the same advertisement or advertisement category to the user.

When selecting geofences, the system can avoid selecting geofences that correspond to advertisements or advertisement categories recently shown to the user. This will be the case unless the system decides that these geofences have to be selected in order to enhance the user profile in order to improve targeting of future advertisements associated with the category of geofences.

For example, if a user has crossed several BestBuy™ geofences in the past and triggered a "buy our featured TV" advertisement several times, the crossing of another geofence of the same category (e.g., a BestBuy, electronics, or other similar category) will not trigger an advertisement in the same category again due to cap on the number of times the user can see the same ad during a particular period of time.

3. The system uses a historical conversion rate of advertisements and their expected return to determine which geofences to select in high geofence density areas. Geofences can be deprioritized on based on such factors. Geofences are deprioritized when they are tied to campaigns that have historically triggered low returns or low conversion rates for this specific user (or in general). This will be related to geofence prioritization based on active, soon-to-be started, and often-run ad campaigns and campaign constraints.

4. The system retrieves historical data and determines whether the user will or will not move significantly or is on his way to a specific location. For example, if the user is on a highway on his morning commute, we can infer what city he is going to from historical data and determine the best geofences at that location instead of the closest around him right now.

Specifically, geofences are selected based on a previously taken path by the user, rather than a user's location. This behavior of the system may be triggered by the time of day (e.g., commute time period such a 7-10 a.m. or 3-7 p.m.) or day in the week (e.g., week day rather than weekend day).

5. The system determines the best proximity geofences using latitude and longitude. For beacons specifically, which are typically identified by a universally unique identifier (or UUID) with a minor and a major values, the system can register only one geofence defined by a single UUID (but with minor and major unspecified) and have an unlimited number of beacons in any location with the same UUID but different latitude and longitude. When the system registers a geofence with a UUID only, any beacon with the same UUID (even if the major and minor values are different) will be triggered.

For example, a retail chain may want to detect a user entering any of their 10,000 store locations in the United States. The retailer can install 10,000 beacons with the same UUID but a unique major and minor value combination at each store entrance. The system registers a single geofence defined by this UUID. When a device with the geofencing SDK comes in proximity to any of these beacons the geofence crossing signal will be triggered.

If, in addition to detecting user entering any of its store locations, the retailer also wants to detect a user entering a particular department inside a store, the retailer can install additional beacons inside each store, such as one additional beacon in each department (e.g., one in TV department, one in computers department, or so forth). Under this model, all beacons in the store would have the same UUID but different minor and major values. The system can now use a store geofence crossing signal triggered by a single UUID-based geofence to infer a new set of geofences. Each geofence is associated with a particular department inside this store. The association is defined by precise minor and major value combinations. This approach limits the need for high frequency active polling when the user is outside of the store.

6. The system determines a location of a device using control geofences with a large geographical coverage. Upon crossing one of these large geofences, the system gets updated location information and then progressively selects available geofences within or near the geofence with the larger coverage. As the area corresponding to each geofence becomes smaller, the system can more accurately pinpoint the location of the device.

FIGS. 15A-15E show sample scenarios of using a sequence of control geofences with progressively reduced coverage area to work around the limitation on the maximum number of geofences a device can register at the same time.

FIG. 15A shows nine geofences in an example area. The active and control geofences are organized by a clustering or hierarchical structure. In this figure, there are six active geofences 1521, two smaller control geofences 1523, and a larger control geofence 1525. Each of the two smaller control geofences 1523 encompasses a group of three active geofences 1521. And these two smaller control geofences 1523 are positioned within a larger control geofence 1525.

The active geofences correspond to active advertisement campaigns currently in the system, or soon-to-be-started or frequently run advertisement campaigns, or to high-value categories that might help targeting future advertisement campaigns. The control geofences are not necessarily tied to an advertisement campaign, but assist the system in determining a special update event. The system does not need to register the more fine-grained geofences until a control geofence has been crossed. This clustering technique enables the device to work around the limited number of geofences a single device can register.

FIG. 15B shows the device registering a first geofence, the larger control geofence, to monitor.

FIG. 15C shows the device entering a first (larger) control geofence. Upon crossing the larger control geofence, the two smaller control geofences (e.g., more granular control geofences) are registered on the device and the first (larger) control geofence is deregistered from the device.

FIG. 15D shows the device entering one of the smaller control geofences. Upon crossing this smaller control geofence, three active geofences contained within this smaller control geofence are registered on the device, and two smaller control geofences are deregistered from the device.

FIG. 15E shows that as the device moves away, the less granular control geofences are registered on the device again.

This technique also limits the need for high frequency active polling.

7. The system determines a direction a user is likely traveling. The system selects geofences that correspond to the likely route taken by the user. The system receives a user's direction and speed, recent succession of crossed geofences and category of recently crossed geofence to infer the best next set of geofences to send back to the device. For example on a highway, all geofences that are behind the car are irrelevant. The system can also select only geofences at a largest city in front of the car within a reasonable radius.

FIGS. 16A-16C show sample scenarios of geofence selection when a user is traveling at a high speed. For example, the user is driving southbound on I-880 in California and the system will select geofences that cover areas further south on I-880 than the user's immediate location.

FIG. 16A shows a user traveling in a vehicle such as a car, truck, or motorcycle. The system receives from the user's device speed and direction of the user. FIG. 16A also shows the six geofences available on the system's backend for that area.

FIG. 16B shows that the device registers the three geofences 1633, 1636, and 1639 (shown in solid lines and shaded) at the bottom of the figure. The user is closer to three unregistered geofences 1642, 1645, and 1648 (shown in broken lines without shading) than the three registered geofences 1633, 1636, and 1639. When the system selects geofences to be monitored by the device, the system chooses the most relevant ones and not necessarily the closest ones.

FIG. 16C shows that the probabilities of crossing these geofences are higher. This is because the system received information on the speed and direction of the user.

8. The system determines more than one geofence has been entered and exited within a short period of time (e.g., 1 minute, 2 minutes, 3 minutes, 5 minutes, 15 minutes, 30 minutes, or other time period). If the geofences are sufficiently far apart the system can infer that the user is travelling. The system can setup control geofences in the next populated area in the general direction the user is travelling, rather than actual geofences in direct proximity.

9. The system receives geofencing information indicating a user is at a special category of location. Some examples of these categories include airports or highways. The system will select geofences in the nearest city rather than directly around the user. For example, if user is at San Francisco airport (SFO), the system selects geofences further away than San Bruno or Millbrae, which are cities located next to the SFO airport.

10. Various delivery and targeting constraints of an advertisement campaign influence selection of geofences being monitored by the device.

Examples of campaign delivery constrains include campaign start and end dates, total campaign budget, frequency caps (e.g., maximum number of campaign advertising impressions allowed to be served to a user for a period of time), and various campaign-wide caps and pacing requirements (e.g., limitations on a total number of campaign ad impressions allowed to be delivered during a period of time).

Examples of targeting constraints include various geolocation, temporal, or audience filters (e.g., disallowing delivery of campaign ad impression to users in specific geolocations, during specific times of day or days of week, or belonging to specific segments or audience). If, for example, an advertisement campaign is about to finish its budget, geofences associated with the campaign are given lower priority. If, on the other hand, an advertisement campaign is approaching its start date, geofences associated with the campaign are given higher priorities.

Multiple Applications

In an implementation, a user's device has installed two or more applications that include system's geofencing SDK. The system can make an optimization to distribute geofences across multiple apps. This means that, although operating systems can impose limits to the number of geofences monitored by an application, by using more than one application the system can effectively increase the number of possible geofences monitored. For example, if a device has two partner applications implementing the system's geofencing SDK, the back-end can use this knowledge to leverage the geofencing information obtained by each application together.

When several partner applications containing system's geofencing SDKs are installed on the same device, the SDKs register with the system each partner application that is installed on the device. Many devices prevent applications from modifying, accessing, or identifying other applications running on a particular device at a given time. This might be done for security (e.g., prevent a mobile game from accessing banking application information), stability (e.g., prevent data corruption, prevent reduced system performance), or other reasons.

However, since the system can access identifying information of the device (e.g., advertisement identifiers provided by the device) provided by each partner application installed on the device, the system can match the identifying information and assume that the two applications are installed on the same device if they associated with the same device identifiers. This allows the system's backend to coordinate SDKs integrated in partner applications installed on the same device. For example, if the device is an iOS device, the system's backend will send twenty geofences for the first app's SDK and twenty different geofences to the second app's SDK, with no overlap among sent geofences.

In effect the system will use all the previously described geofence managing strategies but with a limit of forty instead of twenty geofences. In a further implementation, the system will choose the particular geofences to be monitored on a device and the number of geofences. The system can choose to monitor more or fewer geofences depending on how many geofences are relevant to a device at a given moment, battery considerations, efficiency considerations, or other reasons.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
receiving first activity information for a sender of a first link to at least one recipient is collected by a collection resource at a Web site, wherein no personally identifiable information of the sender is collected in collecting the first activity information;
storing the first activity information at a storage server;
receiving second activity information when a recipient accesses the first link sent by the sender corresponding to the first activity information stored at the storage server, wherein no personally identifiable information of the recipient is collected in collecting the second activity information;
using at least one processor, attempting to identify a first node representative of the sender in a social graph, wherein nodes in the social graph do not store personally identifiable information;
when a first node representative of the sender in a social graph is not identified and after receiving the second activity information, creating a second node to represent the sender in the social graph;
receiving a geofencing alert from a mobile device of a mobile user, wherein a geofencing software development kit is integrated in an application on the mobile device, and the geofencing alert is a result of the mobile device entering a geofence location;
using at least one processor, based on the geofencing alert, attempting to identify a third node representative of the mobile user in a social graph, wherein no personally identifiable information of the mobile user is collected in the geofencing alert,
when a cookie is included with the geofencing alert, extracting a user identifier from the cookie and attempting to identify a node in the social graph having the same user identifier, and
when a cookie is not included with the geofencing alert, receiving at least one device fingerprinting attribute from the mobile device and using the at least one device fingerprinting attribute to identify a node match in the social graph; and
when a third node representative of the mobile user in a social graph is not identified, creating a fourth node to represent the mobile user in the social graph.

2. The method of claim 1 wherein the at least one device fingerprinting attribute from the mobile device does not include personally identifiable information.

3. The method of claim 1 comprising:
associating with the fourth node the geofence location that triggered the geofencing alert.

4. The method of claim 1 wherein the device identifier comprises a hashed device identifier.

5. The method of claim 1 wherein the using the at least one fingerprinting attribute to identify a node match in the social graph comprises:
inferring a relationship exists between the mobile device and another device if the two devices are often reported to be at a location or vicinity of the location during the same or similar time period.

6. The method of claim 1 wherein the at least one fingerprinting attribute comprises at least one of device identifiers; IP addresses; operating systems; browser types; browser versions; or user navigational, geo-temporal, and behavioral patterns.

7. The method of claim 1 wherein the collection resource at a Web site used to collect first activity information comprises a sharing widget.

8. The method of claim 1 wherein the collection resource at a Web site used to collect first activity information comprises a uniform resource locator (URL) shortening.

9. The method of claim 1 wherein the collection resource at a Web site used to collect first activity information comprises an instant messenger application.

10. The method of claim 1 comprising:
serving a personalized content to the mobile user based on a connectivity of the fourth node within the social graph, wherein the personalized content is personalized to the fourth node, which is representative of the mobile user.

11. The method of claim 1 comprising:
serving a personalized content to the mobile user based on the geofence location that triggered the geofencing alert, wherein the personalized content is personalized to the mobile user for the geofence location.

12. The method of claim 1 wherein the serving a personalized content to the mobile user is via a push notification message to the mobile device.

13. The method of claim 1 wherein the geofencing alert from a mobile device of a mobile user is triggered while the mobile device is inactive.

14. The method of claim 1 wherein the geofencing alert from a mobile device of a mobile user is triggered while the application with the geofencing software development kit is closed.

15. The method of claim 1 comprising:
receiving a bid request from a real-time bidding exchange;
determining the bid request is associated with the fourth node in the social graph; and
based on at least information associated with the fourth node in the social graph, determining a personalized digital content for a bid in response to the bid request.

16. The method of claim 15 comprising:
using the social graph, selecting a personalized digital content for delivery to the recipient, wherein the personalized digital content is personalized to the fourth node, which is representative of the mobile user.

17. A method comprising:
receiving first activity information for a sender of a first link to at least one recipient is collected by a collection resource at a Web site, wherein no personally identifiable information of the sender is collected in collecting the first activity information;
storing the first activity information at a storage server;
receiving second activity information when a recipient accesses the first link sent by the sender corresponding to the first activity information stored at the storage server, wherein no personally identifiable information of the recipient is collected in collecting the second activity information;
using at least one processor, attempting to identify a first node representative of the sender in a social graph, wherein nodes in the social graph do not store personally identifiable information;
when a first node representative of the sender in a social graph is not identified and after receiving the second activity information, creating a second node to represent the sender in the social graph;
receiving a geolocation information from a mobile device of a mobile user, wherein a nongeofencing software development kit is integrated in an application on the mobile device, and the geolocation information is a result of the mobile device using the application at a geolocation;
using at least one processor, based on the geolocation information, attempting to identify a third node representative of the mobile user in a social graph, wherein no personally identifiable information of the mobile user is collected in the geolocation information,
when a cookie is included with the geofencing alert, extracting a user identifier from the cookie and attempting to identify a node in the social graph having the same user identifier, and
when a cookie is not included with the geofencing alert, receiving at least one device fingerprinting attribute from the mobile device and using the at least one device fingerprinting attribute to identify a node match in the social graph; and
when a third node representative of the mobile user in a social graph is not identified, creating a fourth node to represent the mobile user in the social graph.

18. The method of claim 17 comprising:
enriching the fourth node of the social graph with the geolocation information, wherein the fourth node does not store personally identifiable information.

19. The method of claim 17 comprising:
upon the mobile device entering a geofence location and the mobile device in inactive and the application is closed, not receiving a geofencing alert from a mobile device of a mobile user.

20. The method of claim 17 wherein the using the at least one device fingerprinting attribute to identify a node match in the social graph comprises:
using probabilistic matching to identify the node match in the social graph.

* * * * *